United States Patent [19]
Hurd et al.

[11] Patent Number: 5,982,441
[45] Date of Patent: Nov. 9, 1999

[54] SYSTEM AND METHOD FOR REPRESENTING A VIDEO SEQUENCE

[75] Inventors: Lyman P. Hurd; Jarkko J. Kari, both of Atlanta; Gang Liang, Norcross, all of Ga.

[73] Assignee: Iterated Systems, Inc., Atlanta, Ga.

[21] Appl. No.: 08/586,341

[22] Filed: Jan. 12, 1996

[51] Int. Cl.$^6$ ...................................... H04N 7/28
[52] U.S. Cl. ............................. 348/417; 348/418
[58] Field of Search .................. 348/414, 417, 348/418, 422

[56] References Cited

U.S. PATENT DOCUMENTS

| | | | |
|---|---|---|---|
| 5,124,791 | 6/1992 | Israelsen | 348/417 |
| 5,132,792 | 7/1992 | Yonemitsu | 348/416 |
| 5,477,272 | 12/1995 | Zhang et al. | 348/407 |
| 5,767,911 | 6/1998 | Boon | 348/412 |

FOREIGN PATENT DOCUMENTS

| | | | |
|---|---|---|---|
| 0406074 | 6/1990 | European Pat. Off. | |
| 0502622 | 2/1992 | European Pat. Off. | |
| 9520296 | 7/1995 | WIPO | H04N 7/28 |

OTHER PUBLICATIONS

"Image Compression via Improved Quadtree Decomposition Algorithms"; Eli Shusterman and Meir Feder; *IEEE Transactions on Image Processing*; vol. 3; No. 2; Mar. 1994; pp. 207–215.

"Image Compression with Variable Block Size Segmentation"; Jacques Vaisey and Allen Gersho; *IEEE Transactions on Signal Processing*; vol. 40; No. 8; Aug. 1992; pp. 2040–2060.

PCT Publication WO 94/18799 "Interframe Video Encoding and Decoding System"; Qualcomm Incorporated.

PCT Publication WO 95/14349 "Quadtree-Structured Walsh Transform Video/Image Coding"; National Semiconductor Corporation.

Tree-Structured Scene Adaptive Coder, Peter Strobach, *IEEE Transactions on Communications*, Apr. 4, 1990, vol. 38 pp. 477–486.

Efficient Quadtree Coding of Images and Video, Gary J. Sullivan and Richard L. Baker, *IEEE Transactions on Image Processing*, May 3, 1994, vol. 3, pp. 327–331.

Rate–Distortion Optimized Motion Compensation for Video Compression Using Fixed or Variable Size Blocks, Gary J. Sullivan and Richard L. Baker, *Globecom '91*, 1991, pp. 85–89.

Efficient Quadtree Coding of Images and Video, Gary J. Sullivan and Richard L. Baker, *IEE*, 1991, pp. 2661–2664.

Low Rate Coding of Moving Images Using Motion Compensation, Vector Quantization and Quadtree Decomposition, Gary J. Sullivan, Ph.D. Dissertation, UCLA School of Engineering and Applied Science (Aug. 1991), Department of Electrical Engineering.

*Primary Examiner*—Howard Britton
*Attorney, Agent, or Firm*—Morris, Manning & Martin, LLP

[57] ABSTRACT

A system and method is disclosed for representing each frame in a sequence of video frames in terms of a correlation between successive video frames. The system and method of the present invention segment the current video frame data and a previous frame into blocks for which motion vectors and/or affine mapping coefficients may be determined. The motion vectors may then be used to represent the current frame data without requiring periodic transmission of a base, self-referential frames of video data. Preferably, the compressor which generates the codewords to represent the current frame data subdivides the blocks of the current frame and previous frame buffers to further evaluate motion factors which may be used to represent current frame data. This evaluation is performed in a recursive manner and preferably includes evaluation of a bit rate/distortion factor to optimally select codewords for representing the current frame data. The bit rate parameters are generated by an entropy encoder which encodes the codewords generated by a compressor in a known entropy coding manner, such as Huffman encoding. Preferably, the decompressor for regenerating previous frames of video data includes a weighted mask filtering of the regenerated frames to reduce blocking artifacts in the regenerated frame data.

25 Claims, 17 Drawing Sheets

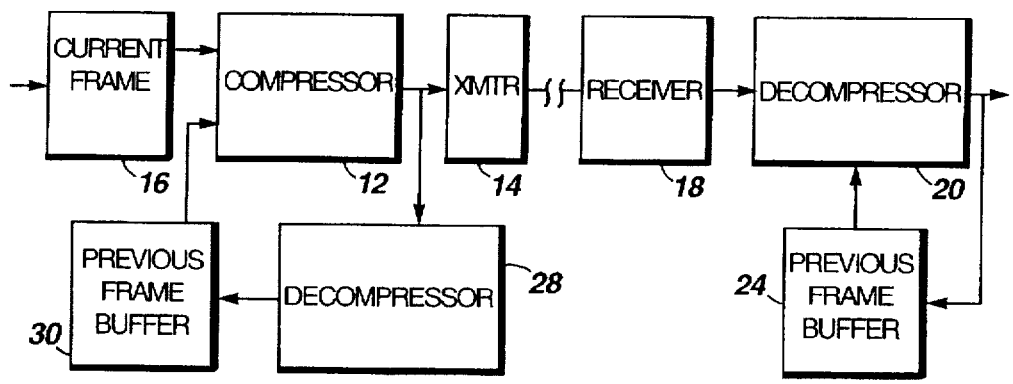
FIG. 1
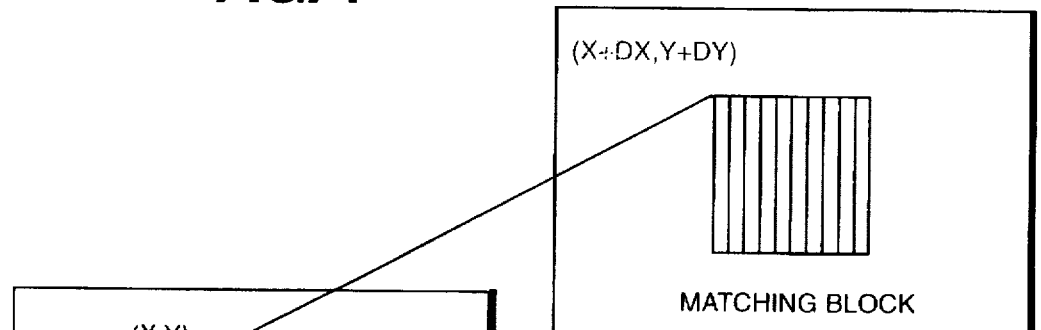
FIG. 2A
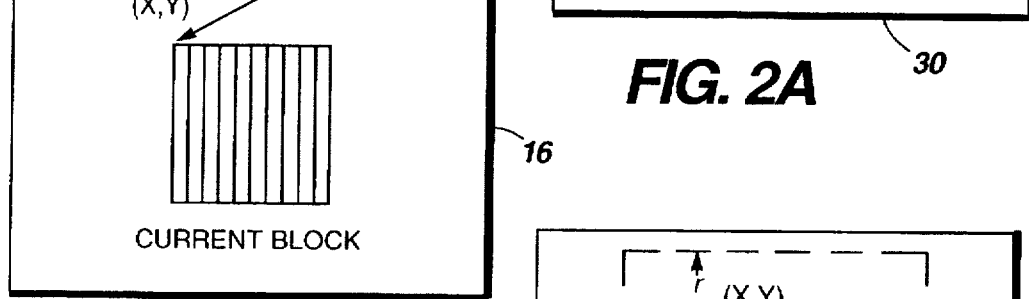
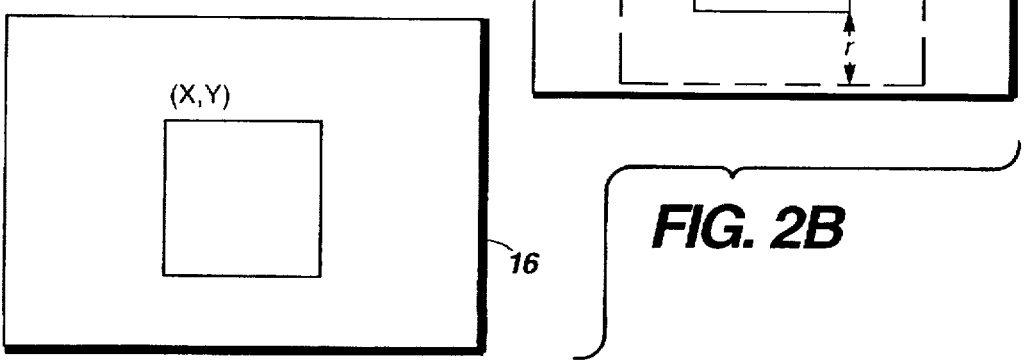
FIG. 2B

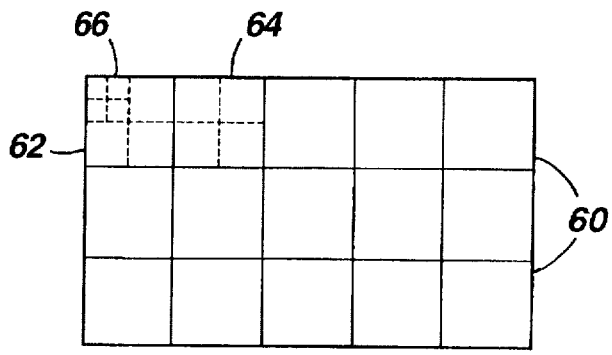
FIG. 4
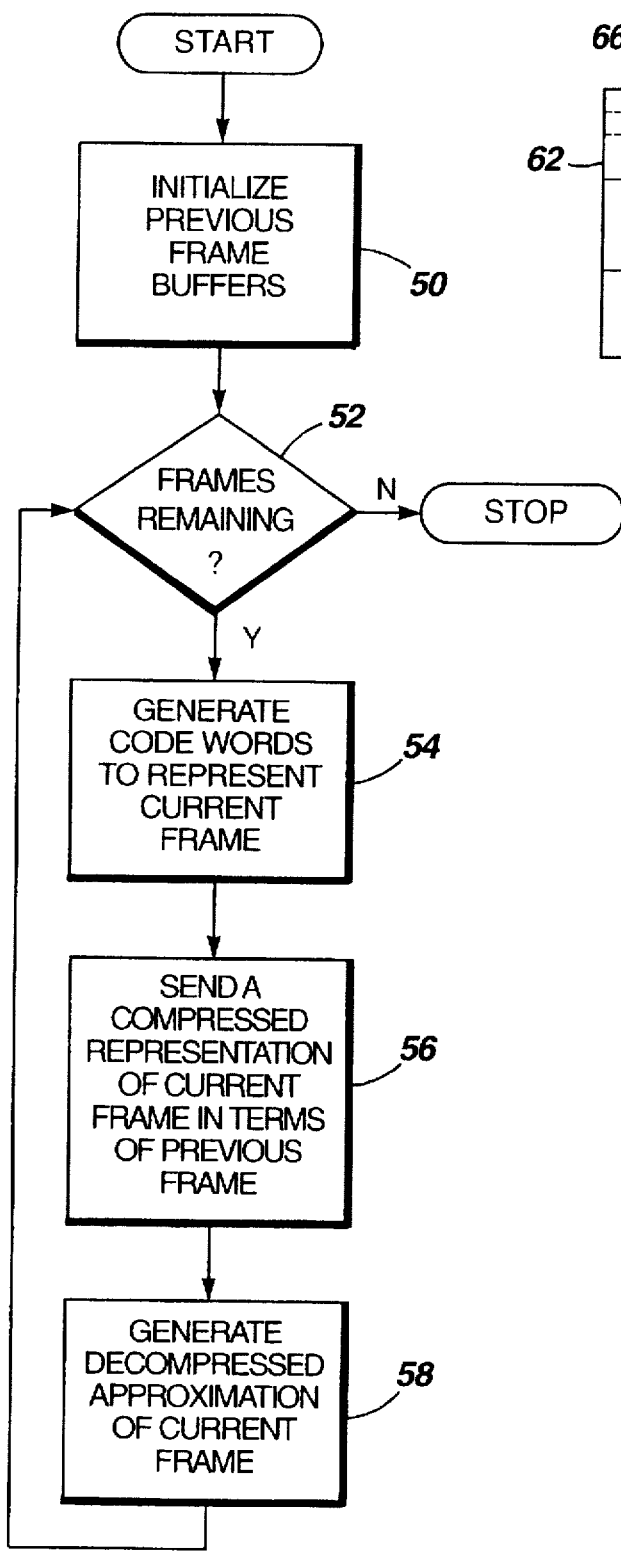
FIG. 3
FIG. 5

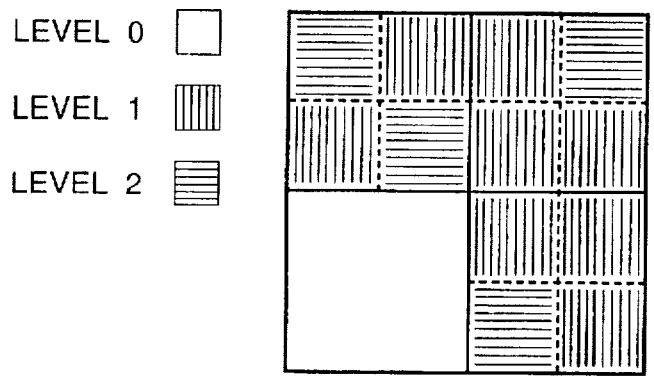

FIG. 6

SORTED BY BLOCK:

CODEWORD FOR TOPMOST LEVEL, I.E. LEVEL 0     (SHAPE = 13)
    CODEWORD FOR CHILD 0 AT LEVEL 1     (SHAPE = 9)
        CODEWORD FOR CHILD 0 AT LEVEL 2     (SHAPE = 0)
        CODEWORD FOR CHILD 3 AT LEVEL 2     (SHAPE = 0)
    CODEWORD FOR CHILD 2 AT LEVEL 1     (SHAPE = 4)
        CODEWORD FOR CHILD 2 AT LEVEL 2     (SHAPE = 0)
    CODEWORD FOR CHILD 3 AT LEVEL 1     (SHAPE = 2)
        CODEWORD FOR CHILD 1 AT LEVEL 2     (SHAPE = 0)

FIG. 7A

SORTED BY LEVEL:

CODEWORD FOR TOPMOST LEVEL, I.E. LEVEL 0     (SHAPE = 13)
CODEWORD FOR CHILD 0 AT LEVEL 1     (SHAPE = 9)
CODEWORD FOR CHILD 2 AT LEVEL 1     (SHAPE = 4)
CODEWORD FOR CHILD 3 AT LEVEL 1     (SHAPE = 2)
CODEWORD FOR CHILD 0 AT LEVEL 2     (SHAPE = 0)
CODEWORD FOR CHILD 3 AT LEVEL 2     (SHAPE = 0)
CODEWORD FOR CHILD 2 AT LEVEL 2     (SHAPE = 0)
CODEWORD FOR CHILD 1 AT LEVEL 2     (SHAPE = 0)

FIG. 7B

| 1 | 4 | 7 | 10 | 13 | 16 | 19 | 22 | 25 | 28 | 31 |
|---|---|---|---|---|---|---|---|---|---|---|
| 34 | 37 | 40 | 43 | 46 | 49 | 52 | 55 | 58 | 61 | 64 |
| 67 | 70 | 73 | 76 | 79 | 82 | 85 | 88 | 91 | 94 | 97 |
| 100 | 103 | 105 | 109 | 112 | 115 | 118 | 121 | 124 | 127 | 130 |
| 133 | 136 | 139 | 142 | 145 | 148 | 151 | 154 | 157 | 160 | 163 |
| 166 | 169 | 172 | 175 | 178 | 181 | 184 | 187 | 190 | 193 | 196 |
| 199 | 202 | 205 | 208 | 211 | 214 | 217 | 220 | 223 | 226 | 229 |
| 232 | 235 | 238 | 241 | 244 | 247 | 250 | 253 | 256 | 259 | 262 |
| 265 | 268 | 271 | 274 | 277 | 280 | 283 | 286 | 289 | 292 | 295 |

Y

| 2 | 5 | 8 | 11 | 14 | 17 | 20 | 23 | 26 | 29 | 32 |
|---|---|---|---|---|---|---|---|---|---|---|
| 35 | 38 | 41 | 44 | 47 | 50 | 53 | 56 | 59 | 62 | 65 |
| 68 | 71 | 74 | 77 | 80 | 83 | 86 | 89 | 92 | 95 | 98 |
| 101 | 104 | 107 | 110 | 113 | 116 | 119 | 122 | 125 | 128 | 131 |
| 134 | 137 | 140 | 143 | 146 | 149 | 152 | 155 | 158 | 161 | 164 |
| 167 | 170 | 173 | 176 | 179 | 182 | 185 | 188 | 191 | 194 | 197 |
| 200 | 203 | 206 | 209 | 212 | 215 | 218 | 221 | 224 | 227 | 230 |
| 233 | 236 | 239 | 242 | 245 | 248 | 251 | 254 | 257 | 260 | 263 |
| 266 | 269 | 272 | 275 | 278 | 281 | 284 | 287 | 290 | 293 | 296 |

| 3 | 6 | 9 | 12 | 15 | 18 | 21 | 24 | 27 | 30 | 33 |
|---|---|---|---|---|---|---|---|---|---|---|
| 36 | 39 | 42 | 45 | 48 | 51 | 54 | 57 | 60 | 63 | 66 |
| 69 | 72 | 75 | 78 | 81 | 84 | 87 | 90 | 93 | 96 | 99 |
| 102 | 105 | 108 | 111 | 114 | 117 | 120 | 123 | 126 | 129 | 132 |
| 135 | 138 | 141 | 144 | 147 | 150 | 153 | 156 | 159 | 162 | 165 |
| 168 | 171 | 174 | 177 | 180 | 183 | 186 | 189 | 192 | 195 | 198 |
| 201 | 204 | 207 | 210 | 213 | 216 | 219 | 222 | 225 | 228 | 231 |
| 234 | 237 | 240 | 243 | 246 | 249 | 252 | 255 | 258 | 261 | 264 |
| 267 | 270 | 273 | 276 | 279 | 282 | 285 | 288 | 291 | 294 | 297 |

U       V

|   | SHAPE | x | y | q |
|---|---|---|---|---|
| Y 32x32 | YES | YES | YES | NO |
| Y 16x16 | YES | YES | YES | YES |
| Y 8x8 | YES | YES | YES | YES |
| Y 4x4 | NO | YES | YES | YES |
| U,V 16x16 | YES | NO | NO | NO |
| U,V 8x8 | YES | YES | YES | YES |
| U,V 4x4 | NO | YES | YES | YES |

SYSTEM AND METHOD FOR REPRESENTING A VIDEO SEQUENCE

FIELD OF THE INVENTION

This invention relates to image data compression and, more particularly, to representing image data in a sequence of video frames.

BACKGROUND OF THE INVENTION

The communication of video data over standard communication conduits is challenging. Video data is transmitted in frames at a typical rate of 10 frames per second. Each frame is comprised of three arrays of pixel data which represent the red, green and blue (RGB) color space for a color screen. Typically, the red, green and blue pixel data are represented in luminance/chrominance color space which is expressed in Y, U and V components. The conversion from the RGB color space to the YUV color space is well known and is performed to reduce the number of pixels needed to represent a frame of data. For example, a typical video screen is comprised of 352×288 pixels. For the RGB color space, each pixel is represented by three data elements since one data element is used to represent each color component. If a single byte is used to represent each data element then there are three bytes per pixel and a screen requires 304,128 bytes of data to represent the screen. At ten frames per second, 3,041,280 bytes are required for a one second transmission. In the YUV color space, the U and V components may be as small as one-quarter of the Y component. Thus, a sequence of ten video frames may be expressed in YUV color space with as few as 1,520,640 bytes, for example.

While the expression of video data in YUV color space reduces the amount of data needed to represent a video sequence, the amount of data required to transmit a sequence of frames still exceeds the bandwidth of many communication conduits. For example, telephone lines which support digital communications such as ISDN lines only support communications at a 56K bits per second rate. Thus, video data being generated at ten frames a second in the YUV color space generates more data than can be transmitted over an ISDN line. As a result, video data usually requires a communication conduit having a greater bandwidth such as T1 line. However, T1 lines or other lines having sufficient bandwidth for video require special installation and the expense associated with using such lines is significant. Accordingly, the transmission of video data requires expense and facilities not normally available.

In an effort to reduce the amount of data necessary to represent a frame of video data, methods of compressing such data have been developed. Among these methods are Discrete Cosine Transform (DCT), affine map transformation methods, sometimes known as fractal methods, and wavelet compression methods. A compressor implementing one of these methods determines coefficients for a corresponding function which may be transmitted over a communication conduit to a decompressor which uses the coefficients to regenerate a frame of video data. At the simplest level, these methods are used to compress the content of each frame in a sequence in terms of itself. That is, the data content of the frame is compressed to represent the frame. Such compressed frames are sometimes called intraframes, self-referential frames, or I-frames.

Compressors using these methods usually compress frames comprised of YUV color space components because the Y screen component includes most of the detail and edges for the image while the U and V components contain some shading information but not a great deal of image detail. As a consequence, the U and V components are relatively smooth and thus, may be compressed more effectively with fewer resources than any of the components for the RGB color space. While the YUV color space yields better compression ratios than those for RGB color space, compressors using the methods discussed above do not consistently compress video frames within a number of bits that can be transmitted over a relatively narrow bandwidth communication conduit and still retain quality image fidelity.

Another way to represent a frame of data is to express a current frame in terms of the data content of a previous frame. One such method used to represent video frames is motion compensation. A compressor using this method generates motion vectors that describe how to rearrange the data elements of a previously generated frame to generate a current frame. This is normally done by dividing the previously generated frame and current frame into blocks and determining the motion vectors that define how the blocks of the previously generated frame should be moved to best represent the current frame. This method works best for video sequence data in which the content of the scene is relatively stable. For example, a teleconference in which the speakers are seated against a background so that the substantial changes in the content of a frame are the relatively minor facial expressions and body movements of the speakers. However, sequences in which the content of the frames change significantly from one frame to the next are more difficult to represent with this method. This method may also be used with other compression methods as well. For example, the pixel differences between a current and previous frame may be compressed using a DCT method. Efficiencies may be gained by expressing data values as a difference because the data values are smaller. Frames which are expressed as a group of motion vectors which relate a frame to a previous frame are called differential frames. Self-referential compressed frames usually require greater computational time and computer resources for compression and decompression than differential frames.

While the previously known differential methods may be preferred over methods which produce self-referential frames only, there are a number of reasons that compressor/decompressor systems which only generate differential blocks are not implemented for low bit rate communication. For one, compressors using these methods may not be able to find a good match between a current frame and a previous frame for a number of reasons. In order to more quickly locate a block in a previous frame which corresponds to a block in the current frame, the compressor searches the previous frame in a limited range about the pixel address corresponding to the address of a block in the current frame. While this reduces the time required for a search, it may result in a poor match. For example, if an object being imaged moves from one portion of a frame to another which is outside the search range of the compressor for a particular block, then the compressor does not find a good match for the block. The poor correspondence of the current frame block to blocks in the previous frame may be handled by representing the current frame block in a self-referential manner. Such self-referential compressed blocks are called residual blocks. The use of residual blocks require the decompressor to be able to distinguish between compressed differential blocks and compressed self-referential blocks since they are decompressed differently. As noted above, the decompression of the self-referential blocks are more computationally complex, require more computer resources and take more time. Accordingly, such compressors/decompressors usually cannot consistently support general video frame transmission over low bandwidth conduit while maintaining quality image fidelity.

Another problem with the previously known methods is that they only approximate the frames of data being generated by a video camera and the like. Thus, the frames being regenerated by a decompressor at a transmission receiver do not exactly reproduce the frames at the compressor. This distortion is especially detrimental to schemes which express a current frame as a difference or movement of data elements in a previous frame. As a consequence, the regeneration of a current frame at the decompressor differs from the current frame at the compressor and since the regenerated frame is used by the decompressor to regenerate the next current frame, the discrepancy grows between compressor and decompressor. To reduce this discrepancy, the compressor usually includes a decompressor as well. The decompressor coupled to the compressor regenerates the approximation of the current frame in the same manner as the decompressor which receives the transmitted coefficients. The decompressed frame is used by the compressor to determine the coefficients or motion vectors which best represent the next current frame. Since both decompressors implement the same decompression method, the compressor is generating coefficients based on an accurate representation of the regenerated data available to the decompressor at the receiver site.

Compressors/decompressors which compress/decompress differential frames require initialization. Initialization is a problem in such compressors because there is no known way to represent the first frame in a differential manner since there is no previous frame in this case. Accordingly, an intraframe is required to begin the transmission process. The self-referential intraframe is used to initialize the decompressor at a receiver and the decompressor at the compressor site, if one is used there. In order to decompress the intraframe, however, the compressor/decompressor must be able to generate and decode compressed self-referential frames and compressed differential frames. Compressors/decompressors supporting both types of frames are more computational complex than if they simply decompress one type of data representation. However, because the transmission of an intraframe is required to initialize the video frame sequence transmission, a decompressor which supports differential frame representations alone is not feasible.

Intraframes are also used to rectify transmission errors caused by noise or the like. Such errors may corrupt a differential frame during transmission. The next frame regenerated by the decompressor using the corrupted frame generates an erroneous frame which differs from the frame being compressed by the compressor at the transmitting site. As motion vectors and coefficients based on the previous frame at the compressor are applied to the erroneous frame regenerated at the decompressor, the error is compounded. Soon, the frames regenerated by the decompressor may bear no resemblance to the frames being represented by the compressor. In order to ensure that the decompressors at the transmitter and receiver sites are regenerating the same frames, an intraframe is periodically transmitted. The decompression of the self-referential intraframe at the transmitter and receiver sites provides the sites with the same frame for representing and decompressing frames unless the intraframe was corrupted during transmission. Intraframes are usually transmitted at a frequency to ensure that an uncorrupted intraframe is received by the receiver often enough to support transmission integrity.

Even in relatively noise-free environments, the previously known methods of compressing video frames require the periodic transmission of intraframes to correct artifacts introduced in the regenerated frames. Many of the methods use rectangular or square blocks to compress frame data and the boundaries of such blocks may generate artifacts, especially in the DCT method. Artifacts produced by the block boundaries are used by the compressor to erroneously represent data and they propagate through subsequently regenerated frames at the receiver decompressor if self-referential intraframes are not periodically transmitted. Thus, there are a number of reasons that current compressor/decompressor systems are dependent on the frequent transmission of intraframes to provide error tolerance in the transmission of video frames. As noted above, the use of intraframes impact the efficiency and processing times for such systems to the extent that they may not be able to consistently support low bit rate video transmissions.

Other known compressor designs include two or more of the above discussed methods. For example, a compressor may use the motion compensation and DCT methods together. This may be done by comparing a current frame to a previous frame to generate a set of motion vectors that represent the current frame in terms of the previous frame. Because the motion vectors do not adjust the pixel values but merely describe movement of blocks in the previous frame which represent the current frame, a second comparison is performed. In this comparison, the pixel values of the previous frame are subtracted from the pixel values of the current frame and the differential pixel values are compressed using a DCT or other compression method. The compressed differential frame is sometimes called a residual frame. While this compressor design improves the motion compensation only method, it requires that the current and previous frames be processed twice to generate the frame representation. Additionally, there are two components of the representation, each of which must be processed differently to regenerate the frame. Thus, such compressors are computationally expensive and the generation of two components may require a number of bits which may impact the ability of the compressor to limit the number of bits required for a low bit rate transmission.

Another limitation of previously used methods is the manner in which frames are segmented to determine coefficients or motion vectors. Usually, the frame data is divided into rectangular or square blocks. This shape may not conform to an object in an image or to its movement from one frame to another. Yet the resources to support different shapes and sizes for compression has been heretofore too great for compression/decompressor schemes intended for low bandwidth communication conduits. In fact, many compressors/decompressors cannot process frame sizes which are not an integral multiple of the fixed block sizes used by the compressor/decompressor or those for which the compressor/decompressor may be configured. Even those compressors/decompressors which attempt to process frames which cannot be divided into a integral number of blocks supported by the compressor/decompressor, use methods which may introduce artifacts into regenerated frames. For example, some methods pad the incomplete block in the current frame with zero values. In the differential methods, the use of these non-existing values require special processing or they may generate erroneous values.

Special case processing includes the grouping of the pixels into a residual block for self-referential compression or a shift in the processing of the frame to include the pixels on a second pass. Thus, special processing requires additional computer resources and processing time while erroneous values corrupt the integrity of the frames being compressed and regenerated. In either event, known compressors/decompressors do not adequately support frame sizes and shapes which do not conform to an integral of the block size used by the compressor/decompressor. For similar reasons, previously known compression/decompression methods do not support segmented video. Segmented video is the separation of data which can be integrated into a single frame. For example, a camera generating frames containing the antics of actors and another stream of frames containing background scenes may be integrated at a receiving site. However, there needs to be a way to keep the two frame streams separate since pixel data about the actors would corrupt the data integrity of the background scene for decompression of the next current frame. Current methods do not support such selective processing within a frame, especially if the separation of the objects in the frame is irregular and does not conform to the block shapes and sizes supported by the compressor/decompressor.

Previously known frame compressor methods result in different amounts of data to represent different frames. These differences mean that some frame representations require fewer bits for transmission than others. The number of bits for transmitting a representation is usually compared to a maximum in an effort to keep the number of bits transmitted over a standard unit of time constant. However, this method fails to take advantage of the greater accuracy which could be obtained for frames which require fewer bits to represent. Instead, the accuracy of any frame representation tends to be approximately the same since the method for determining the coefficients on vectors which represent a frame does not change regardless of the number of bits generated by the compressor. While some methods for generating frame representations do vary the number of bits used for a representation, these methods do not consistently support low bit rate communication with quality image fidelity.

What is needed is a method for representing frame data using a differential scheme without requiring any transmission of a self-referential frame.

What is needed is a method for representing frame data which reduces blocking artifacts in regenerated frames.

What is needed is a method for representing frames having sizes or shapes which are not integral multiples of the block shapes and sizes supported by the compressor/decompressor.

What is needed is a method for supporting segmented video.

What is needed is a method for representing frame data which uses different sized and shaped blocks to determine the coefficients and vectors for representing the frames.

What is needed is a method which does not require the use of residual blocks to process poor correspondence current frame blocks.

What is needed is a compressor/decompressor which need not support the compression/decompression of both self-referential and differential blocks.

What is needed is a method for representing frame data which adjusts the determination of the coefficients and vectors in response to a measurement of the number of bits required to represent the determined coefficients and vectors.

SUMMARY OF THE INVENTION

The limitations of the previously known systems and methods are overcome by a system and method performed in accordance with the principles of the present invention. The method is comprised of the step of determining for each frame in a sequence of data frames a data representation which correlates a current frame of pixel data at a first location to a previous frame of pixel data so that the data representation may be used to regenerate the current frame of data from a second previous frame of pixel data at a second location. The system of the present invention includes a current frame buffer in which a current frame of video data is segmented into blocks, a previous frame buffer in which a previous frame of video data is segmented into blocks, and a compressor for generating a data representation of the current frame, the compressor including a previous buffer data element adjuster that adjusts data elements of the previous data buffer in accordance to data elements in the current frame and a motion vector generator for generating motion vectors which spatially correlate blocks in the current frame to blocks in the previous frame so that the data representation generated by the compressor includes at least one motion vector and a data adjustment value.

Preferably, the video data within the current frame buffer and the previous frame buffer are segmented into parent blocks of a first size. A plurality of blocks in the previous frame buffer are identified as a range area of corresponding blocks for one of the parent blocks in the current frame buffer. Preferably, the corresponding blocks in a range area have their data elements adjusted by a data adjustment value q which corresponds to a measured parameter correlating the data values for the range area in the previous frame buffer to those in the current frame buffer. Most preferably, this measured parameter is the difference between the mean value for the data elements in the parent block of the current frame and the mean of the data elements in a corresponding block in the range area of the previous frame buffer. An evaluation measurement is computed for each parent block/corresponding block combination for the range area. The motion vector and q parameter corresponding to the parent block/corresponding block combination having the best evaluation measurement defines a vector which is included as a component of the data representation for the block in the current frame. Vector and data representation are used herein to denote the coefficients and parameters used to represent a block.

To evaluate whether the data representation of the parent block may be improved, the parent block in the current frame buffer is preferably segmented into child blocks having a second size and a range area in the previous frame buffer corresponding to one of the child blocks is identified and adjusted. Again, an evaluation measurement for each child block/corresponding block in the range area is obtained and the motion vector corresponding to the block pair having the best evaluation measurement is determined. Preferably, the vector and best evaluation measurement for the child block is compared to the vector and best evaluation measurement for the parent block to determine whether the vector for the child block is to be used in the representation of the parent block. If it is not, the evaluation of the other child blocks is performed. Otherwise, the child block is segmented into next generation blocks and a range area in the previous block is identified and adjusted. Again, an evaluation measurement is made for each next generation/corresponding block combination and the best evaluation measurement is used to determine a vector for the next generation block. The best evaluation measurement and vector for the next generation block is compared to the vector and best measurement evaluation for the child block to determine whether the vector for the next generation is included in the representation of the parent block. If it is not, the remaining next generation blocks of the child block are processed. Otherwise, the next generation block is segmented into next generation blocks having a size less than the next generation block being segmented. This level of next generation blocks is processed as the child/next generation block level. This level processing continues until the next generation block is a predetermined minimum size which is not processed or until the best evaluation measurement of a segmented block is not better than the best evaluation measurement of the block from which it was segmented. While the predetermined minimum block size may be one pixel, preferably, the predetermined minimum block size is a 4×4 pixel block size.

From this description, one can appreciate that the first parent block of the current frame is processed, followed by one of its child blocks, followed by one of the child block's next generation block and so on until the predetermined minimum block size is reached or the best evaluation for a segmented block is not better than the best evaluation measurement for the block from which it was segmented. Most preferably, the conditions for determining whether a block should be segmented and processed include determining whether the best evaluation measurement can be improved. For example, if the best evaluation measurement includes a distortion measurement component and the distortion measurement for a block level is determined to be zero, no further processing is required since a zero distortion measurement cannot be improved. Thus, segmentation of the block into next generation blocks and their processing is not necessary. Once a processing termination condition is achieved, the processing continues for the remaining blocks on the level at which processing ceased. When all of the blocks on a level have been processed, processing continues on the block level from which those blocks already processed were segmented. This process continues until all of the child blocks at that level have been processed. This structure of parent block processing is tree oriented and is preferably implemented in a recursive manner. Preferably, each level of block is segmented into quadrants except the predetermined minimum block level. After all of the child and next generation blocks for a parent block have been processed and the data representation for a parent block completely determined, the next parent block in the current frame buffer is selected and processed. Once a data representation for all of the parent blocks have been determined, the representation for the current frame is complete and the buffer may be rewritten with the next current frame to represent.

Preferably, the vector for any current frame block other than a parent block is expressed as a difference between the vector for the current frame block and its parent block. This reduces the number of bits required to express a vector. Preferably, all of the vectors determined to represent a current frame are encoded using a entropy coding method before transmitting the codes to a decompressor. This entropy encoding further reduces the size of the bit stream required to required to represent the current frame. This, in turn, facilitates the compressor generating a data representation at a bit rate which may be supported by a low bandwidth communication conduit while maintaining quality image fidelity.

Most preferably, the evaluation measurement is a comparison between the number of bits needed to encode a data representation for a block in the current frame buffer and a distortion measurement associated with that block. This evaluation measurement is preferably a sum of a bit cost value for encoding the data representation for a block and the distortion measurement corresponding to a difference between the block in the current frame buffer and the block being moved by the motion vector to represent the block in the current frame. The bit cost value is preferably the number of bits required by an entropy coder to encode the data representation for the block multiplied by the negative slope of a line tangent to a bit rate/distortion curve. The distortion measurement is preferably a squared difference measurement or an absolute difference measurement.

For evaluating which data representation best represents a block in the current frame being compared to blocks in the range area, the one having the lowest evaluation measurement is selected. For determining whether a data representation for a child or next generation block should be included in the data representation for the parent block, the difference between the evaluation measurements without the additional vector and with the additional vector is computed. This difference indicates whether the number of additional bits required to encode the data representation for the child block is justified by the improvement in distortion, if any. Since the bit cost is positive (number of bits increases by adding another vector) and the distortion is negative (accuracy increases with use of additional vector) a negative evaluation measurement indicates that the vector or data representation for the block is selected to represent the parent block. While an evaluation measurement based on distortion measurements alone may be used, the preferred evaluation measurement improves the compression of a current frame for a low bit rate transmission by only selecting those motion vectors which contribute to accuracy of the data representation without unnecessarily increasing the bit stream produced by the compressor. Preferably, the bit cost for a vector is obtained by passing the vector representing a block to the entropy encoder which returns the number of bits needed in a codeword to represent the vector.

The segmentation of the blocks in the current frame forms "blocks" having different sizes and shapes than previously known methods and systems. The higher representation accuracy made possible by these differently shaped and sized blocks are verified against the corresponding bit cost for the codeword which represents the blocks. This also provides a method for evaluating whether further segmentation and processing should continue for the branch of a node currently being processed. Thus, the preferred method has the flexibility of improving the accuracy of the representation of a block in the current frame which stays within the bit rate requirements for a low bandwidth communication conduit.

Preferably, the system and method of the present invention segments the current frame into a plurality of domain blocks that cover the current frame but which do not overlap. The previous frame is segmented into a plurality of range areas that are larger in size than the domain blocks and are located in the area corresponding to the area of a selected domain block in the current frame. Specifically, after the current frame is segmented into domain blocks, the upper, leftmost pixel address of a domain block is selected to identify a pixel having the corresponding address in the previous frame. A width and height radius are then added to a domain sized block at the identified pixel to identify a range area within the previous frame. Prior to comparing the domain block in the current frame to blocks within this range area, the data values of the pixel elements within the corresponding blocks in the range area are adjusted to improve the correspondence of the pixel values in a corresponding block to those in the domain block. Preferably, this is done by computing a mean data value for the pixels in the domain block and a mean value for the pixels in a corresponding block in the range area. The difference between the domain block mean and the corresponding block mean define a q parameter. This value, which may be negative or positive, is added to all of the data values in the range area. This adjustment reduces the differences between the pixel values in the corresponding block and the domain block. This q factor is a component of the vector which represents the domain block as its value is used by the decompressor at the receiver site to adjust data values in the blocks in the previous frame buffer before using the motion vector component of the vector to regenerate a frame.

The comparison between the pixels of the domain block and a corresponding block begin with a block preferably having its upper, leftmost pixel at the upper, leftmost pixel of the range area. The differences between the pixel values in the domain block and this corresponding block in the range area are measured by using either a squared or absolute value calculation. The corresponding block in the range area is then shifted to define a new corresponding block in the range area and the distortion measurement is calculated again. This continues until there are no longer any corresponding blocks to evaluate in the range area. The motion vector to represent the domain block may be selected by preferably comparing the evaluation measurements for each domain block/corresponding block combination for the range. Alternatively, the lowest distortion value may be used without factoring the bit cost for the codeword representing the vector. The motion vector component is then determined by computing the difference in the x, y coordinates for the corresponding block in the range area and the domain block in the current frame. The motion vector is included in the vector which represents the domain block.

The adjustment of the corresponding blocks in the range area prior to the block comparison permits the system and method of the present invention to avoid the use of residual blocks. That is, the values of the pixels within the domain block contribute to the calculation of the q factor which is then used to adjust the values in the corresponding blocks in the range area. This adjustment improves the correspondence between the domain block and one of the corresponding blocks in the range area so that residual blocks are not generated. For example, if an object moves so quickly that it is outside of the range area, the q factor adjustment causes the pixels representing the object in the previous frame to be modified but not disappear. Accordingly, other objects which did not move as quickly may be used to define the movement of the best corresponding block so that the object remains in a frame regenerated with the data but the object's location may be inaccurate. However, subsequent frames permit the representation of the object to "catch up" to the object in the frame, or, if the object passes out of the frame, move out of the frame a little slower than it actually occurred. While there may be some inaccuracy in the representation, still the object did not disappear from the frame nor did it require a residual block and the attendant additional complexity required for compressing and decompressing such blocks.

Preferably, the corresponding blocks in the range area are selected by incrementing, one pixel at a time, the address in one direction so that all possible corresponding domain blocks in the range area of the previous frame are considered in the comparison with the domain block. To improve the processing speed, this identification of corresponding blocks in the range area may be performed by incrementing a pixel address in one direction by 2 or some other integral number of pixels. This has the advantage of searching fewer blocks for a match but may miss a best matching block. Other known methods for improving search times may be used in the system and method of the present invention. Alternatively, the range area may be used to comprise corresponding blocks for comparison to the domain block by selecting every other pixel in the range area beginning at a pixel location. This, in effect, shrinks a block in the range area that is twice as big as the domain block size so it corresponds in size to the domain block for a comparison. Such known techniques for generating blocks to compare to the domain block may be used in the system and method of the present invention.

In another preferred embodiment, the data representation of a current frame may be generated by evaluating data representations for blocks of the same size and then determining whether the data representation for a block which is a union of the blocks is more efficient. This embodiment is called a bottom up implementation while the implementation discussed above which compares the data representation of a block to the data representation of a block segmented from it is called a top down implementation. The bottom up implementation initially begins by dividing the current frame into blocks having the same size as the top level blocks of the top down method. Using these blocks, motion vectors are predicted for the blocks which may be used to express the motion vectors for other blocks as differential vectors. The current frame is then segmented into blocks of a predetermined minimum size. One of these blocks is then selected as a domain block and a range area within the previous frame is identified. Blocks within the range area are compared to the selected domain block and a best vector is selected preferably using the evaluation measurement discussed above. This best vector selection is performed for each block in the current frame.

The bottom up method continues by increasing the size of the domain block to an integral of the first domain block size. Preferably, the integral size is double the first domain block size. The blocks of the first domain block size within the enlarged domain block are identified and a motion vector for the enlarged block is determined by identifying a range area in the previous buffer and determining the vector as discussed above. For each possible combination of domain blocks within the enlarged block, a vector is determined which represents the domain block combination and the portion of the enlarged block that remains. This representation preferably includes a new q value for the remaining area of the enlarged block which is based on the difference between the mean of the data element values in the domain blocks for the enlarged block which are not in the selected domain block combination and the mean for the data elements in the domain sized blocks of the corresponding block for the enlarged block in the range area of the previous frame which are not in the selected domain block combination. The new q and new distortion measure based on the new q which is a sum of the new distortion for the domain blocks not in the domain block combination are used to generate an evaluation measurement for the enlarged block. The evaluation measurements for all of the domain block combinations are compared and the combination that has the least evaluation measurement is selected. If the selected combination does not require any vector for representing a portion of the enlarged block then the evaluation of larger blocks stops. Otherwise, the domain block may be considered as having merged into the enlarged block/domain block combination vector. This process may be repeated for the next integral size of enlarged blocks until the top level size block is reached.

The calculation of the new q and corresponding new distortion measurement is computational expensive. Preferably, the squared measurement is used since it may be expressed as a sum of algebraic quantities some of which involve q and some which do not. Those quantities not involving q may be calculated and stored in memory when the q parameter for the enlarged block is calculated. When q and the corresponding distortion measurement for each q domain block combination needs to be calculated, the quantities using the new q parameter are calculated and added to the stored terms for that area. Thus, all terms for the squared measurement need not be calculated each time a new q parameter is calculated.

Most preferably, a bubble-up implementation is used to perform the bottom up method. This method begins by selecting a range area for a set of domain sized blocks and defining a set of motion vectors which move a domain sized block about the range so all of the range area is covered. Preferably, the number of domain blocks selected cover an area which corresponds to the size of the top level block in the top down approach. Then one of the motion vectors is selected and an evaluation measurement for each block is stored. The blocks are then grouped together to form an enlarged block. For example, four 4×4 blocks are grouped to form an 8×8 block. The motion vector for the lower block is applied to this block and the vector for the block determined. For each domain block combination within this enlarged block, an evaluation measurement is computed and a best combination stored along with the evaluation measurement. The enlarged block is then grouped with adjacent enlarged blocks to form a new enlarged block and a best evaluation measurement and block combination selected. This process continues until the top level is reached. The process then returns to the bottom domain block level, selects a new motion vector and computes new evaluation measurements. Any evaluation measurement which is better than the prior evaluation measurement results in the new vector and evaluation measurement being stored for the block. At the enlarged block level, the new motion vector is applied and the combination with the lower block levels evaluated to determine whether any of the vectors representing the enlarged block are better than the previous vector. If so, the vector and evaluation measurement are stored and the process continues up to the top level. This iterative process continues until all of the motion vectors have been applied and the best vector selected for each block in each level. This approach conserves memory as only the best vector selected at any time during the process is stored in memory with its corresponding evaluation measurement. Thus, the algebraic terms stored for each block need not be stored as required in the method discussed above.

The system and method of the present invention preferably incorporate a function for processing blocks or objects within a frame which do not conform to standard domain block sizes or shapes. This function is accomplished by identifying a bit mask which uses out of range values to identify pixels which may be used to calculate motion vectors. For example, if a domain block in the current buffer is at the edge of the frame and does not conform to the size of a standard domain block, a bit mask is formed which has the size of the standard domain block but which includes identifiers to identify those pixels which should not be used to represent the current frame. Accordingly, during compression, the compressor detects these values and does not include corresponding pixels in the range area for the distortion measurements. The decompressor likewise forms such a bit mask if the frame size does not conform to the domain block sizes used by the decompressor.

These bit maps may also be used to support segmented video. By using such a bit mask, any portion of a domain block may be removed from the calculations for determining the correspondence of a domain block to a corresponding domain block in the current frame in the range area and from the q parameter calculation as well. However, the bit mask identifying the values which are not to be included in the data representation scheme must be transmitted to the decompressor so it operates using the same information. By using such a bit mask, a regenerated frame may contain a gray area into which another frame of video data may be decompressed to integrate two video frame sequences.

To reduce artifacts, the differences in motion vectors at the boundaries between the blocks in the current frame buffer are measured to determine whether the frame data should be filtered prior to the determination of the motion vectors. If the filter should be applied, it is preferably a weighted mask applied to the pixels in the outer two rows of a block. This filtering tends to attenuate differences between adjacent blocks without losing detail in the image information in the block. Thus, the probability of artifacts are less likely and the differential scheme may be used to represent all frames of a video sequence.

In a preferred implementation of a decompressor in accordance with the principles of the present invention, each data element along a block boundary for a block in a regenerated frame at a decompressor are generated as a sum of data elements in the previous frame which lie along the block boundary which have been filtered with a weighted mask. The weighted contribution of the data elements in the previous buffer along the block boundary tends to reduce artifacts in the regenerated frames. More preferably, the data elements along the block boundaries of a block within a regenerated frame are generated by a weighted sum of pixel values selected by motion vectors which correspond to a group of blocks adjacent to the block in the previous frame which is moved to generate the block in the regenerated frame. Most preferably, the weighted sum also includes an adjustment to the data elements prior to filtering them through the weighted mask. Preferably, the value to be added to the data elements is a mean data element value for a predefined group of pixels near the block boundaries of the block in the previous frame which is moved to generate the block in the regenerated frame. The smoothing provided by this method tends to reduce artifacts even when the differences between the pixel values at the boundary of a block differ by a significant amount.

These and other advantages and benefits of the present invention may be ascertained from the detailed description of the invention and the accompanying drawings.

BRIEF DESCRIPTION OF THE DRAWINGS

The accompanying drawings, which are incorporated and constitute a part of this specification, illustrate a preferred and alternative embodiments of the invention and, together with the general description given above, and the detailed description of the embodiments given below, serve to explain the principles of the invention.

FIG. 1 is a block diagram of a system which incorporates the principles of the present invention to represent video frames;

FIG. 2A is an example of how a motion vector is used to correlate a block from a previous frame to a current frame;

FIG. 2B depicts a range area in the previous frame buffer of FIG. 1 that corresponds to a block in the current frame buffer of FIG. 1;

FIG. 3 is a flow chart of the frame compression process performed by the compressor of FIG. 1;

FIG. 4 is an example of segmentation of the current frame buffer or previous frame buffer into parent blocks and child blocks;

FIG. 5 is a depiction of the bit map codes and corresponding block segmentation used in the preferred embodiment of the present invention;

FIG. 6 is an example of the segmentation of a parent block into child blocks;

FIGS. 7A and 7B are examples of the organization of a vector for the parent block and child blocks for one screen component of a video frame shown in FIG. 6;

DETAILED DESCRIPTION OF INVENTION

Figure 8A:
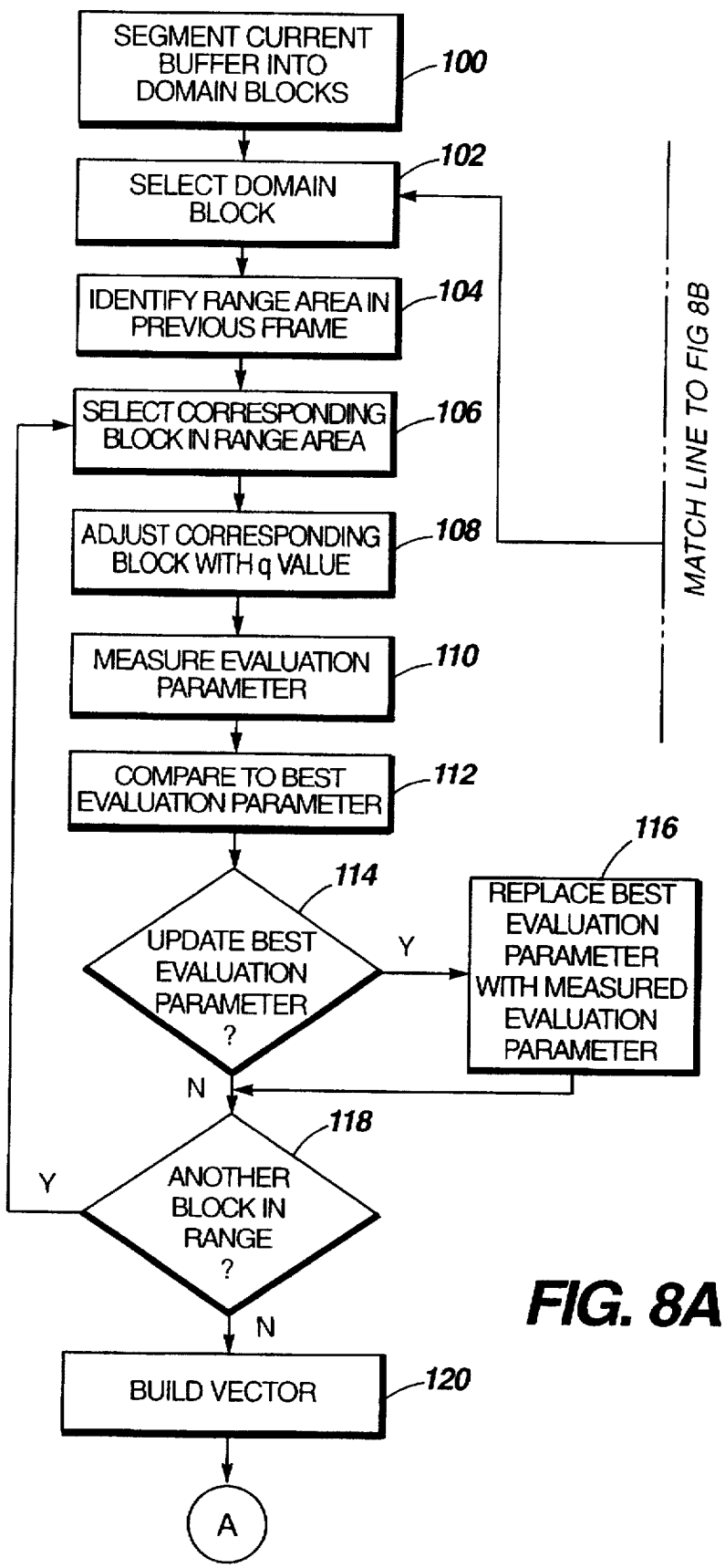
FIGS. 8A and 8B are a flowchart of the block compress process implemented by the compressor of FIG. 1.

A system which implements the method of the present invention is shown in FIG. 1. The system 10 includes a compressor 12 which generates vectors or data representations which are a correlation between a current frame of video data contained within current frame buffer 16 and a previous frame contained in frame buffer 30. The contents of current frame buffer 16 are supplied by a video sequence generator, such as a camera or the like (not shown). The vectors generated by compressor 12 are output to a transmitter 14 which transmits the data representation of the current frame to a receiver 18. Receiver 18 provides the vectors to a decompressor 20 which applies the motion vectors, coefficients, and parameters contained in the vectors to the data elements stored in previous frame buffer 24 to generate a current frame for display and to replace the contents of frame buffer 24. The vectors output by compressor 12 are also provided to a decompressor 28 which generates a representation of the current frame using the process implemented by decompressor 20. The video frame generated by decompressor 28 is stored in previous frame buffer 30. The contents of previous frame buffer 30 are used by compressor 12 to generate codewords which represent the content of current frame buffer 16.

Preferably, current frame buffer 16, previous frame buffer 30 and previous frame buffer 24, all contain sufficient memory elements to store pixel data elements for a multiple screen component video frame. Most preferably, the frame buffers 16, 30, and 24 are sized to store the Y, U, and V components of a video frame having a width of 352 pixels and a height of 288 pixels. Preferably, each pixel data element is one byte in length to define 256 levels for each of the screen components. As explained above, the U and V components of the YUV color space may be as small as one-quarter of the Y component array, although other ratios may be supported in the system and method of the present invention. Thus, use of the YUV color space reduces some of the computational requirements for generating the vectors which best represent a current frame of video data.

Compressor 12 may be implemented in a real-time or off-line manner. In a real-time manner, the current frames generated by a video camera or the like are written into current frame buffer 16 and are processed by compressor 12 before a next current frame is written to the buffer. The buffer 16 may include storage for more than one frame of data from the video frame generator. In an off-line implementation, compressor 12 generates a data representation for a current frame in buffer 16 in a time which may exceed the update rate for the generation of the next current frame. After the frame representation is generated, it is either stored (in a storage device not shown) or transmitted. Compressor 12 then signals the video frame source to provide the next current frame to frame buffer 16. Preferably, compressor 12 is implemented in a computer program written in the C programming language. The program executes on a personal computer having an Intel 80486 processor supported by 8 MB of RAM and at least 340 MB of hard disk storage. Preferably, frame buffers 16 and 30 are comprised of data elements in the RAM space for the personal computer.

Preferably, compressor 12 of system 10 generates vectors which define data representations for expressing the video data in current frame 16 in terms of video data in previous frame buffer 30. This is preferably done by segmenting the screen components for the video data in each frame buffer into blocks and determining a best match between the blocks of the current frame buffer and those in the previous frame buffer. The location of the blocks which best correspond to one another may be used to determine a motion vector. For example, FIG. 2A shows that a block in the Y component stored in current frame buffer 16 may be generated by moving a block of the Y component stored in previous frame buffer 30. The block in the current frame buffer 16 has its upper leftmost pixel data element located at (x, y). The location of the corresponding block in the Y component stored in the previous frame buffer 16 may be expressed as (x+dx, y+dy) where dx and dy describe a difference in the x and y indices which identify the upper, leftmost pixel data element for the block of the Y component of the previous frame buffer. Thus, (dx, dy) may be used to determine a spatial motion vector which describes the movement of a block of pixels in previous frame buffer 30 to generate a block of pixels that represent a block of pixels in current frame buffer 16. Decompressor 20 may then apply this motion vector to a corresponding block in previous frame buffer 24 to generate a block of video data which corresponds to the block of data in the current frame stored in frame buffer 16.

To find a block in previous frame buffer 30 which corresponds to a block in current frame buffer 16, a search must be performed. Preferably, the search is performed by segmenting the data in current frame buffer 16 into domain blocks having a first size. The vectors which represent each of these blocks are then determined by forming corresponding domain blocks from the pixels within previous frame buffer 30 and measuring an evaluation parameter between the two blocks. FIG. 2B shows how this comparison is performed for a block within the interior of the frame. The search begins by locating the pixel in previous frame buffer 30 which corresponds to the upper, leftmost pixel of a selected domain block in current frame buffer 16. Using a radius parameter, a range area R is identified in previous frame buffer 30. Corresponding blocks are then formed from the pixels within this range area and compared to the pixel values in the domain block. Preferably, this comparison is performed by selecting the pixels corresponding to the domain block size and shape which have as their upper, leftmost pixel the upper, leftmost pixel of the range area. The next block to be compared is identified by adding 1 to all of the x indices of these pixels. This continues until the corresponding domain block in the range area has its rightmost boundary aligned with the rightmost boundary of the range area. The next block to be searched is found by decrementing the y coordinate for all of the pixels in the corresponding domain block. Blocks in this new line are formed by decreasing the x coordinate one pixel at a time until the leftmost boundary of the corresponding domain block is aligned with the leftmost boundary of the range area. This moving of the corresponding block within the range area continues until all of the possible domain size blocks within the range area are compared to the domain block in the current frame buffer 16.

Variations of this search method may be performed to decrease the time for searching. For example, the x coordinates and y coordinates may be increased by 2 or some other integral number of pixel values. By using this method, there are fewer blocks to compare to the domain block and, correspondingly, there are fewer calculations. However, by comparing the domain blocks to fewer blocks, a domain block that produces a "better match" may be missed. In another method, every other pixel in the x and y direction, beginning at the upper, leftmost corner of the range area, is selected from a block which is twice the size of the domain block to generate a corresponding block having the same size and shape as the domain block in current frame buffer 16. Other searching techniques known within the art may be used without departing from the principles of the present invention.

Although the data in current frame buffer 16 are comprised of many elements which correspond to the elements in previous frame buffer 30, rarely are the contents of the current frame buffer merely a translation of data elements in previous frame buffer 30. Instead, lighting conditions usually cause changes in pixel data elements for objects from one frame to the next. Consequently, the system and method of the present invention adjust the data values of the pixel elements in the range area prior to making the block comparison discussed above. Preferably, this adjustment is made by computing the mean pixel value for the domain block in the current frame buffer and the mean pixel value for the range area in the previous frame buffer. The difference between these two means, $d_{mean}-r_{mean}$, is added to each data element in the range area to adjust the pixel values for the range. If an object in the domain block is within the range area of previous frame buffer 30, this adjustment tends to improve the correspondence between the pixels comprising the object in the domain block and the corresponding block in previous frame buffer 30. In this way, the evaluation of the block in previous frame buffer 30 which best represents a block in current frame buffer 16 is improved. Once the corresponding block in previous frame buffer 30 which best represents a domain block in current frame buffer 16 has been identified, the change in location from previous frame buffer to the current frame buffer may be computed. Specifically, this calculation of movement defines the dx, dy components discussed above. Thus, dx, dy, and q may be used to define the movement and adjustment of a block from previous frame buffer 30 to regenerate a block in current frame buffer 16. These parameters dx, dy, and q represent a data representation for a domain block within the current frame buffer.

A more general form of a motion vector used to describe a correlation between a corresponding block in previous frame buffer 30 and a domain block in current frame buffer 16 is:

$$p * \begin{bmatrix} ab \\ cd \end{bmatrix} \begin{bmatrix} i \\ j \end{bmatrix} + \begin{bmatrix} dx \\ dy \end{bmatrix} + q$$

Preferably, i, j defines the indices for the location of the upper, leftmost pixel of a block in the previous frame buffer 30. The matrix comprised of elements a, b, c, d comprise an affine map which may be used to rotate the placement of the elements from the block in previous frame buffer 30. The matrix comprised of the dx, dy element is used to shift the location of the pixel data elements comprising the corresponding block in frame buffer 30. Thus, both of these matrices operate on (i, j) to define a location for a corresponding block in previous frame buffer 30. An intensity factor, p, modifies the data value of all of the pixel data elements in the corresponding block in buffer 30 so they more closely correspond to the data of the domain block in buffer 16. Preferably, p is used to attenuate data values for contractively mapping the pixel values so errors in transmission are dissipated during regeneration of subsequent frames. Such a method is disclosed in co-pending application entitled *System And Method For Contractive Mapping Resynchronization Of A Data Transmission*, Ser. No. 08/497, 218, filed Jun. 30, 1995. Preferably, p is held constant over a frame of data. An additive element q is also added to each pixel data element in a corresponding block. As explained above, q is used to adjust the pixels in the range area to improve correspondence between the domain blocks in the current frame buffer 16 and the corresponding previous frame buffer 30.

When a=d=1 and b=c=0 the above equation is a data representation comprised of a spatial motion vector and a range area adjustment value q. This is the simplest data representation or vector which modifies the content of the data elements in the previous frame. This is the preferred form used in the method and system of the present invention since it permits an accurate representation which may usually be generated within the timing constraints for representing a current frame in a real-time implementation. Non-zero values of b, c permit rotation of the block which may improve the correspondence between a block in buffer 16 and buffer 30. Preferably, predefined b, c non-zero values are used to speed the search for a best correspondence between the application of the affine map equation to a domain block. Thus, predefined rotations of the blocks in the previous frame buffer are used for a best match comparison and preferably, these rotations are 90° rotations of the blocks. However, the use of non-zero elements for b, c also requires additional computer resources to support the computational complexity for the block correspondence comparison. Preferably, compressor 12 generates vectors to represent the current frame data within current frame buffer 16 with a=d=1 and b=c=0. Since p is preferably constant, compressor 12 preferably operates to represent a current frame by determining the values of dx, dy and q that correlate the domain blocks of current frame buffer 16 to the corresponding blocks in previous frame buffer 30.

A high level flow chart for the processing which is performed by compressor 12 is shown in FIG. 3. The process begins by compressor 12 initializing the content of the previous frame buffers 30, 24 (Block 50). This may be done by either one of two methods. In a first implementation, the very first frame of video data may be compressed using some self-referential compression method and this representation is transmitted to decompressor 20 via receiver 16 and provided to decompressor 28 as well. This action results in decompressor 28 decompressing the representation and writing the decompressed approximation of the first frame of video data into previous frame buffer 30. Likewise, decompressor 20 generates a frame of data corresponding to the first frame of the video sequence and this data is likewise used to initialize the previous frame buffer 24. The second method of initialization is to have compressor 12 initialize previous frame buffer 30 to all of the data elements of mid-level gray color and to transmit a start of sequence signal to decompressor 20. In response, decompressor 20 initializes the data elements of frame buffer 24 to the same gray scale values as buffer 30. The second method of initialization is preferred so that decompressor 20 and 28 need not implement a completely self-referential compression scheme as well as supporting the decompression of the data representations generated by compressor 12 in accordance with the principles of the present invention. By setting p<1 and q to a value described in more detail below, convergence to an accurate approximation of the current frame of video data may be quickly achieved.

After frame buffers 24 and 28 have been initialized, compressor 12 checks current frame buffer 16 to determine whether a current frame is ready for processing (Block 52). If none is available for processing, the video sequence is finished and the compressor terminates its processing. Otherwise, compressor 12 uses the contents of previous frame buffer 30 to generate a data representation of the frame data in current frame buffer 16 (Block 54). This representation is provided to transmitter 14 (Block 56) so that the representation may be transmitted to receiver 18 for use by decompressor 28 to generate the next video frame.

Compressor 12 also provides the representation of the current frame of video data to decompressor 28 (Block 58) so that decompressor 28 may generate a frame which corresponds to that generated by decompressor 20. The frame data generated by decompressor 28 is used to overwrite the contents of frame buffer 30. Compressor 12 then checks for another frame to compress (Block 52) and the process continues until the video sequence is finished.

Preferably, the video data comprising the frame data for the video sequence is written to current frame buffer 16 in scanline order and is processed in the same order. While the process thus far described may be used to express a current frame of video data in terms of a previous video frame using vectors, this method still suffers from the limitation that blocks of a single size may not provide the image fidelity desired for the application. Because computation of the specialized form of the equation noted above may be more computer resource efficient than the more general affine map equation, the blocks of the screen components for the video data in frame buffer 16 are, preferably, further divided and evaluated.

As shown in FIG. 4, a frame buffer for one of the screen components may be divided into 15 blocks of a predetermined size 60 (FIG. 4 is provided for illustration purposes only and does not relate to a specific implementation for the present invention). While a corresponding block for each of the blocks 60 shown in FIG. 4 may be found in the previous frame buffer 30, the smaller children blocks into which blocks 62, 64 are further subdivided may correspond more closely to blocks of the same size in frame buffer 30. The processing of the four child blocks in block 62 may result in the determination that one or more of these blocks are better represented by other blocks within frame buffer 30. The remaining blocks are determined to provide no better representation than parent block 62. The blocks selected as providing a better representation may then be further divided and evaluated. For example, one of the quadrants of block 62 in the example of FIG. 4 is shown subdivided into blocks 66. The method of the present invention operates on each of the blocks in a recursive manner, subdividing blocks which more accurately correspond to blocks in buffer 30 until the subdivided child blocks reached a predetermined minimum size. This type of processing may be performed in a recursive manner to generate a tree structure for each of the largest size blocks shown in FIG. 4. Preferably, the blocks for the Y component are 32×32 pixels, 16×16 pixels, 8×8 pixels, and 4×4 pixels in size. These blocks correspond to level 0, level 1, and level 2, level 3, and level 4 blocks, respectively. Because the U and V components are preferably one quarter the size of the Y component, the level 0 blocks are 16×16, level 1 is 8×8, and level 2 is 4×4 in size.

Because each level block may be further sudivided with some of the child blocks resulting in further subdivision, a shape map identifying which blocks are further subdivided is preferably provided in the data representation of a parent block. In the preferred embodiment, a four bit hexadecimal number is used to identify the child blocks which are further divided. The preferred child block representation scheme is shown in FIG. 5. The "1" values indicate child blocks for which further sudivided blocks generate more efficient codes for representing the frame data. The "0" values indicate that the vector for the current level block is sufficient to accurately represent that block of the video frame data.

FIG. 6 shows an example of a level 0 block for which level 1 and level 2 blocks have been identified as better representing a block in current frame buffer 16. The vectors for defining the content for each of these blocks may be organized as shown in FIG. 7a or as shown in FIG. 7b. Other methods for organizing the codewords and yet identify the tree structure for the blocks may also be used. What is important is that decompressors 20 and 28 be programmed to parse the vectors transmitted to it in the same structure in which they are generated by compressor 12.

Figure 8B:
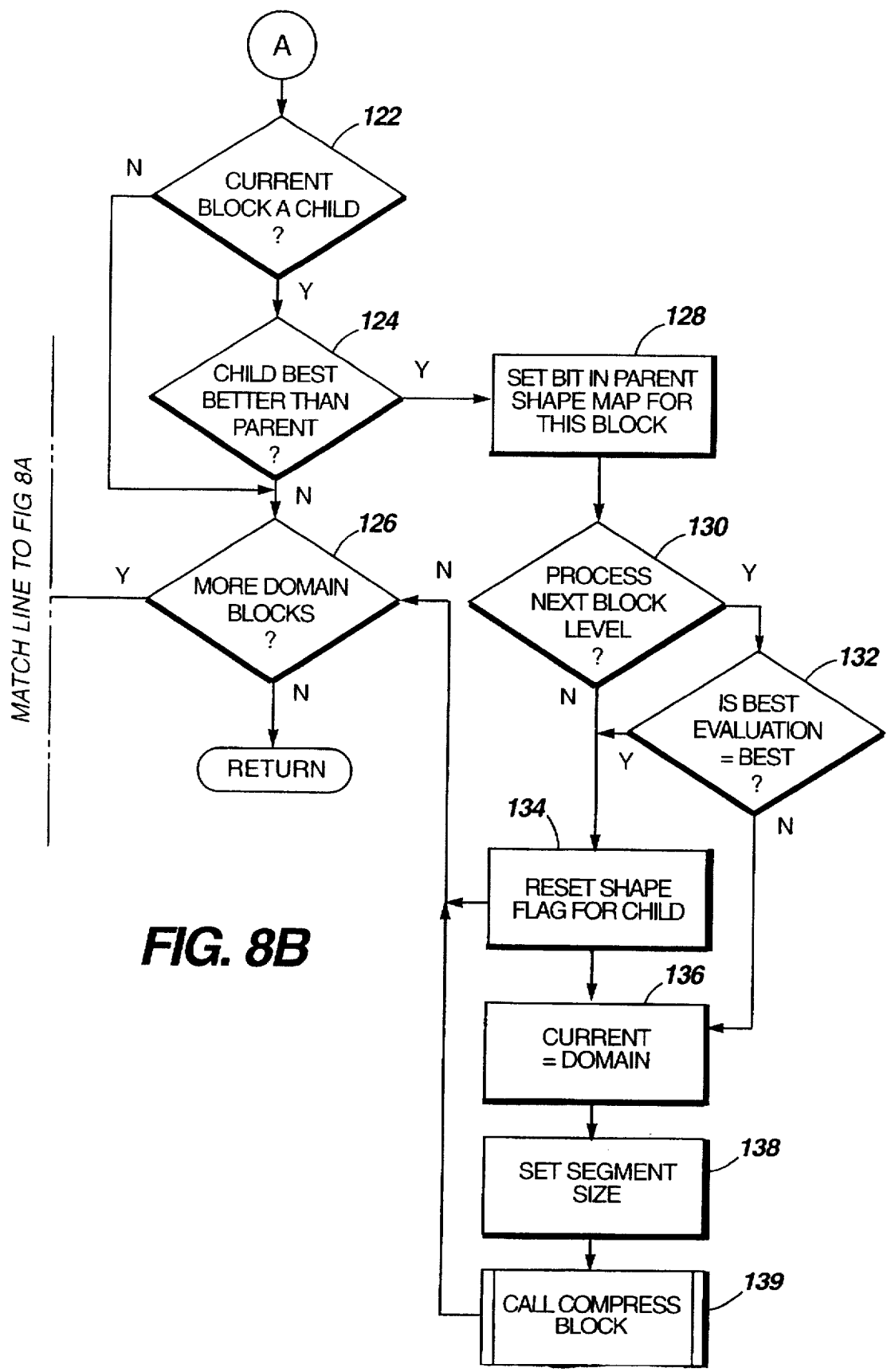

The process for compressing a block is shown in FIG. 8. Preferably, this process is a recursive process though other implementational techniques may be used. The process begins by segmenting the current frame buffer into domain blocks (Block 100). A domain block is then selected (Block 102) and a range area identified within previous frame buffer 30 (Block 104). A corresponding block is then selected within the range area (Block 106). The q parameter is then calculated for the corresponding block in the range area by calculating the difference between the mean pixel value for the selected domain block and the mean pixel value for the corresponding block in the range area. This value is then added to all of the pixel elements in the corresponding block (Block 108). An evaluation parameter measured between the domain block in current frame buffer 16 and the corresponding block in the range area of buffer 30 (Block 110). This evaluation parameter is compared to the previously determined best evaluation parameter for this block (Block 112) and the best evaluation parameter is updated, if necessary (Blocks 114, 116). For example, if the evaluation parameter is a distortion measurement and the distortion measurement for the current corresponding block/domain block pair is less than the previously best calculated distortion parameter for another block pair at this level, then the new distortion parameter replaces the old distortion parameter. The process then determines whether another corresponding block in the range area needs to be evaluated (Block 118) and, if it is, evaluation of the block comparison continues at (Block 106). Otherwise, the process builds a vector by determining the dx, dy components for the motion vector corresponding to the corresponding block/domain block pair having the best evaluation parameter (Block 120). If the domain block is a child of a parent block (Block 122), the evaluation parameter is compared to the best evaluation parameter previously determined for the parent (Block 124). Otherwise, the process verifies whether there are more domain blocks to check (Block 126), and if there are, the process then continues evaluating domain blocks (Block 102). If there are no more domain blocks to process, the process returns.

If the evaluation parameter for the current block level is better than the best evaluation parameter for the preceding block level, a bit is set in the shape field of the preceding block level that indicates the child block vector should be included in the bitstream (Block 128). The process continues by determining whether the next block level is processed (Block 130), and if it is not, the shape flag bit for the current level is set to zero and the process determines whether other domain blocks remain to be processed (Block 128). If the next level of blocks can be processed, the process determines whether the evaluation parameter can be improved (Block 132). If it cannot, the shape flag is reset (Block 134) and remaining domain blocks are processed, if any. If the evaluation parameter can be improved, the process identifies the current frame as the block being processed (Block 136) and segments the current buffer into domain blocks of a predetermined size (Block 138). Preferably, the segmentation of the blocks other than at the parent level is performed by dividing the current block into four equal sized blocks. The process then continues by calling itself (Block 139). Upon the return of the last block down a recursive path, the process verifies whether any more domain blocks at this level remain to be processed (Block 122). If there are, these blocks are also processed. The recursive line of compressed block routines are terminated either by the processing of every block possible in the segmentation tree or achievement of one of the conditions which terminate processing. These two conditions are that the evaluation parameter for a child is not an improvement of the parent evaluation parameter or that the evaluation parameter cannot be improved.

Figures 9, 10:
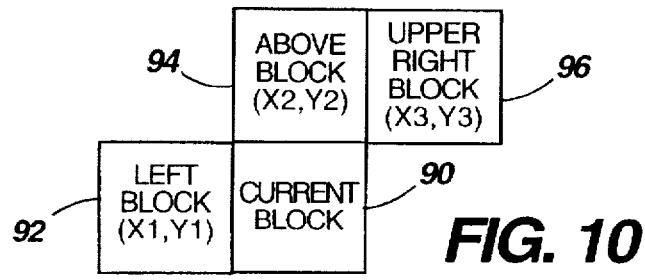
FIG. 9 is an example of the order in which the blocks of the Y, U, V screen components are processed in the preferred embodiment of the invention.
FIG. 10 is an example of the adjacent blocks used to calculate a predicted motion vector for a parent block in the current frame.

Preferably, the Y, U, and V screen components for the video data are processed in an interleaved manner. The preferred ordering for the processing of the preferred block sizes for the Y, U, and V screen components is shown in FIG. 9. Thus, in the preferred embodiment, the shape maps and equation coefficients are determined for the first block of the Y component, followed by the U and the V components, respectively. The process then continues by returning to the Y screen component. This interleaved order of block processing is preferred since certain parameters associated with the processing of the U and V parameters are related to the processing performed for the Y screen component. Other orders for processing the blocks of the screen components and ways of representing the blocks and sub-blocks of each screen component along with their coefficients are also within the principles of the present invention.

As previously discussed, differential values are more easily compressed than absolute values. That is, codes that represent differential values usually have fewer bits. For that reason, the motion vectors for the parent blocks and child blocks of the present invention are expressed in a differential scheme. Preferably, for each block of the Y screen component, a predicted motion vector is calculated. As motion vectors are determined for the level 0 blocks of the first Y block, they may be expressed in terms of the differential with respect to the predicted motion vector. In turn, each sub-block or child block which is selected because it better corresponds to a block in frame buffer 30 may also be expressed in terms of a differential with the predicted motion vector for the level 0 block. When the U and V screen components are processed, the predicted motion vectors are determined by dividing the actual motion vector for the level 0 block of the Y component, if one was determined, by 2. This value becomes the actual motion vector for the U and V blocks and the motion vectors for the lower level U and V blocks are expressed as a differential from this value. In the case where the level 0 block of the Y component does not have a motion vector, that is, all of the child blocks resulted in better correspondence between the current frame buffer 16 and frame buffer 30, the prediction motion vector for the U and V components is calculated by dividing the predicted motion vector for the Y component by 2. While all of the motion vectors for the child blocks at the level 1 and higher levels are expressed as a differential with respect to level 0 motion vectors, they may also be expressed as a differential with respect to the motion vector for the block from which they were subdivided.

The predicted motion vectors for the Y screen component blocks are discussed with respect to the block arrangement shown in FIG. 10. As shown in that FIG., the current block 90 is the Y component block currently being processed. The position of that block within current frame buffer 16 determines how the predicted motion vector is calculated. Preferably, if the current block 90 is the upper-leftmost block in the frame, then the other three blocks 92, 94, 96 are outside the frame and the predicted motion vector for the block is set to (0, 0). If the current block 90 is any block on the upper-most row of the frame buffer, then its predicted value is, preferably, the actual motion vector for the preceding block, that is, block 92. If the block of the Y component being processed is in the leftmost or right-most column of the frame buffer, then the predicted motion vector is, preferably, set to the value of the actual motion vector for the block 94 immediately above current block 90. For all other blocks in the frame buffer, the predicted motion vector is, preferably, the median of the actual motion vectors for the block 92 immediately to the left of the current block, the block 94 immediately above the current block, and the block 96 to the immediate upper right of the current block as shown in FIG. 10. The median motion vector is the vector having for its elements the median of the x components of the vectors and the median of the y components of the vectors. Although FIG. 10 and the above discussion set out the preferred method for generating predicted motion vectors for the Y component, other methods for predicting a motion vector to support a differential scheme for expressing motion vectors are within the principles of the present invention.

Figures 11, 12:
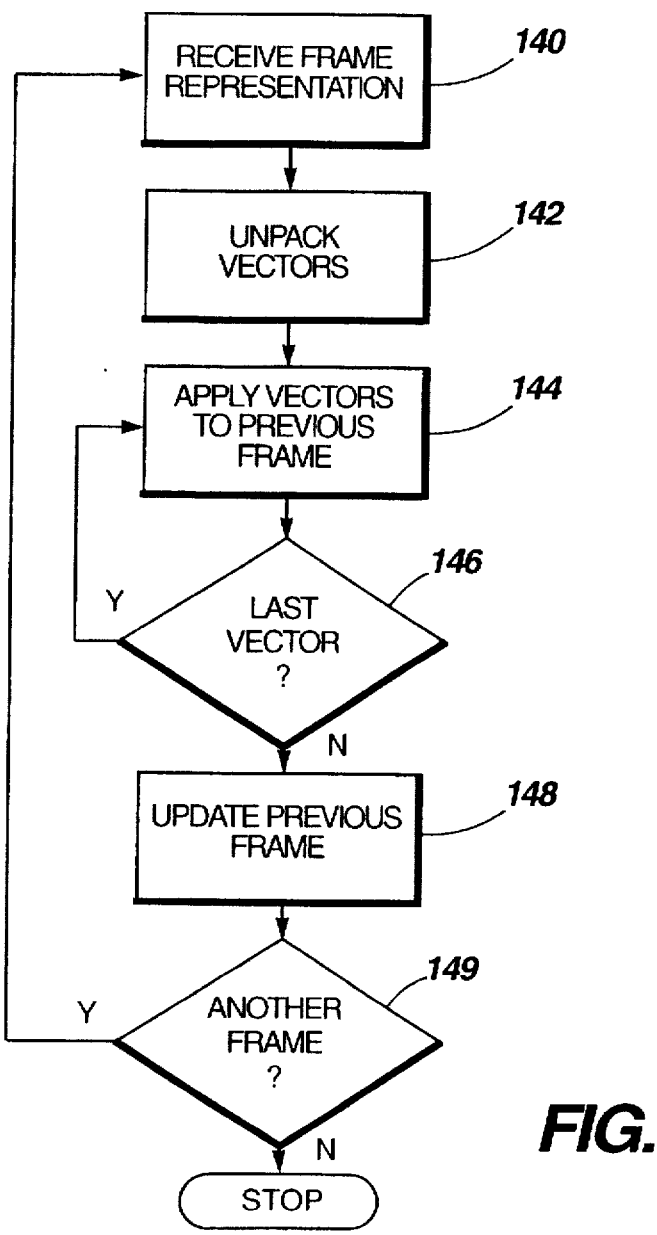
FIG. 11 depicts the preferred fields for the codewords used in the preferred embodiment of the present invention.
FIG. 12 is a flowchart of the decompression process performed by the decompressors of FIG. 1 and FIG. 15.

FIG. 11 shows a table identifying the fields in a vector for the block levels for the Y, U and V screen components of the video data in the preferred embodiment. As noted there, the blocks are preferably processed only to the level of 4×4 data element resolution to reduce the expenditure of computational resources. Reviewing the table, each level 0 block of the Y component, preferably, includes a shape field which identifies which child (level 1) blocks were selected as better corresponding to blocks in frame buffer 30 and the x, y, and q values which identify a motion vector for the level 0 block are provided, unless the shape map is 15. In that case, all of child blocks more accurately represent the frame data. The parameters for level 0, in turn, are followed by the field values for the level 1 child blocks. For each level 1 block selected to represent a block in the current frame, there is a shape field that indicates which child (level 2) blocks segmented from that level 1 block were selected as being in better correspondence with blocks in frame buffer 30. Preferably, this shape identifier is followed by the parameters that define the motion vector for this child (level 1) block. This continues for each level until the 4×4 (level 3) block is reached. The shape field for the level 3 Y component blocks are all 0 since in the preferred embodiment, further processing is not performed. The values for the U and then the V screen components follow the Y screen values. This order is then repeated for the blocks of the next Y, U, and V screen components of the video frame data until all of the blocks in each component have been described. Thus, the vectors generated by compressor 12 to describe the current frame preferably have the form (shape, dx, dy, q), although other orderings may be used. If the more general affine map function is used, the codewords preferably have the form (shape, a, b, c, d, dx, dy, p, q), although other orderings may be used.

The method thus far described provides a number of advantages and benefits over those previously know. For example, the subdividing of parent (lower numbered level) blocks into smaller child (higher numbered blocks) blocks and permitting this division to occur in a recursive manner supports a more flexible method for evaluating correspondence between segments of the current frame buffer 16 and segments of the previous frame buffer 30. Likewise, this selection of blocks having different sizes on different levels also forms blocks which have a shape other than a square or rectangular shape. These other shaped "blocks" group the pixel data elements in current frame buffer 16 and frame buffer 30 in ways not previously known which may result in more accurate representation of the video frame data. This in turn reduces the need for periodically transmitting a base, self-referential compressed representation of a frame to maintain the integrity of the decompression process. The method thus far described also utilizes an affine map component which may be used to further alter the shapes of the segments compared between the current frame and previous frame buffers so that a more accurate correspondence between such segments may be determined. The method thus far described also supports a differential scheme for expressing the motion vector parameters for the blocks with fewer bits which improves the compression of the codewords generated by compressor 12.

The method and system of the present invention also support segmented video. By specifying a group of pixels which are not included in a current frame, the distortion measurement is affected. That is, before computing the difference between two pixels, the pixel is checked to determine whether it is included in the current frame. If it is, the pixel is used in the distortion measurement for the block under evaluation. Otherwise, no difference is computed or a value of zero is added to the distortion measurement. The identifiers for the group of pixels excluded from the current frame are also transmitted to the decompressor so it only moves the pixel elements from the previous frame that correspond to pixels for a current frame. This method of specifying which pixels are in a frame is supported by the present method which evaluates spatial motion and data value adjustment in a single pass.

The method set forth above further facilitates decompression of video frame data at the decompressor. Specifically, because the blocks in current frame buffer 16 and their data representation parameters are independent of one another, the vectors for a first block may be utilized to move data from frame buffer 24 to regenerate a frame while vectors for other blocks are being received. Thus, the decompression time may be reduced as a result of the organization of the codewords used to represent video frame data.

Finally, the method of the present invention supports a property known as zooming. Specifically, decompressor 20 may use extrapolation or interpolation techniques to generate an image which is larger than the image being stored in frame buffer 16. No matter how decompressor 20 generates such an image, it may thereafter generate a current frame by simply multiplying the motion vectors transmitted from compressor 12 by the corresponding ratio factor so that decompressor 20 is simply moving larger blocks of data from frame buffer 24 to generate the larger current frame at the receiver site. Thus, the only factor affecting image fidelity is the process for generating the larger image in the first place. If the image at decompressor 20 is generated using affine map codes, which are independent of pixel resolution, the resulting image and its updating may be quite close to the frame data being generated at the transmitter site.

The process for decompressing a data representation for a current frame is shown in FIG. 12. The process begins by receiver 18 receiving a data representation of a frame (Block 140). The frame representation is then unpacked to retrieve the vectors for the blocks in the frame representation (Block 142). All the vectors may be unpacked before processing continues or, preferably, as a vector for a block is unpacked, it is processed. An unpacked vector is then applied to the previous frame buffer 24 to regenerate a portion of the current frame (Block 144). The process then determines if all block vectors have been applied to the previous frame (Block 146), and if not, the process continues until all of the vectors have been applied. The regenerated frame is then used to update the previous frame buffer (Block 148) and the receiver is checked to see if another frame has arrived (Block 149). If so, the process continues until all of the frames in a sequence have been processed. Otherwise, the decompression process is complete.

Figure 13A:
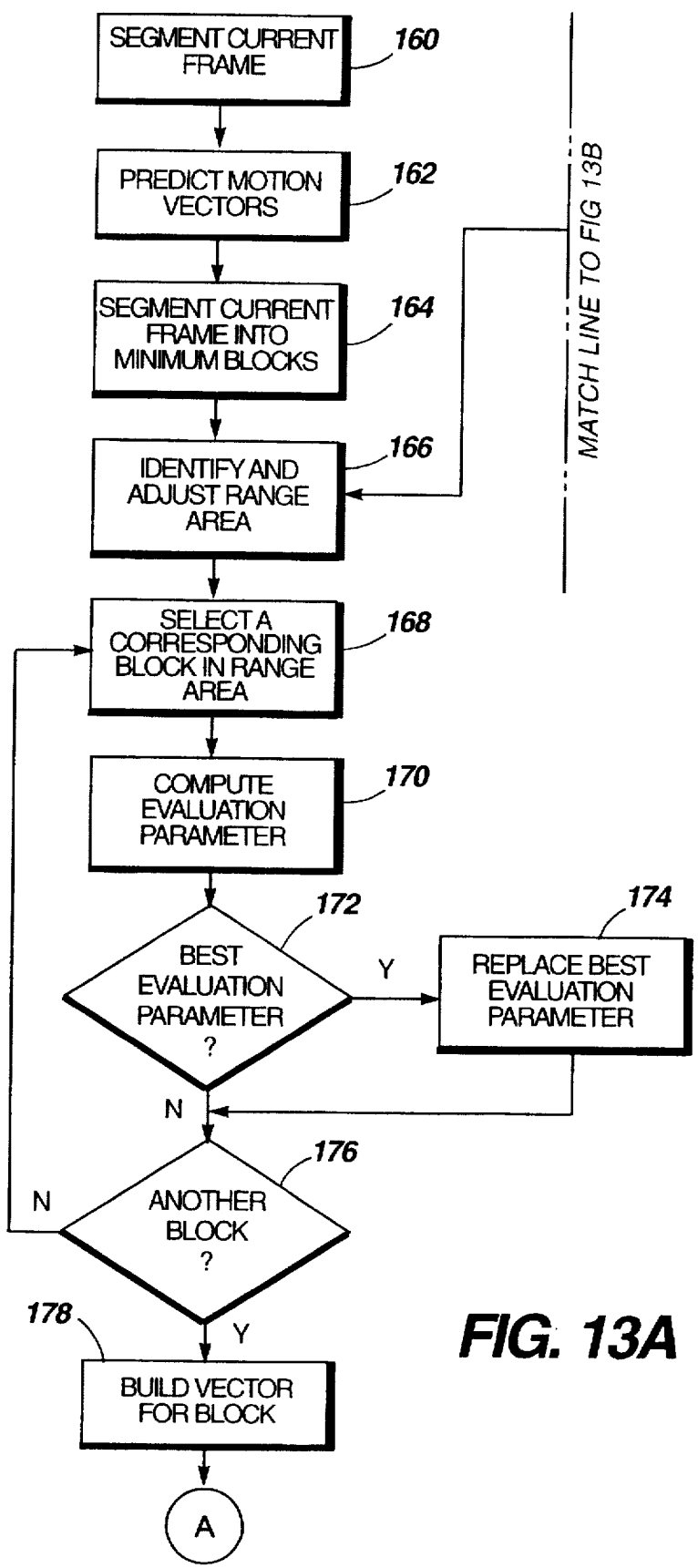
FIG. 13 is a flowchart for a bottom up process for determining a data representation for a frame.
Figure 13B:
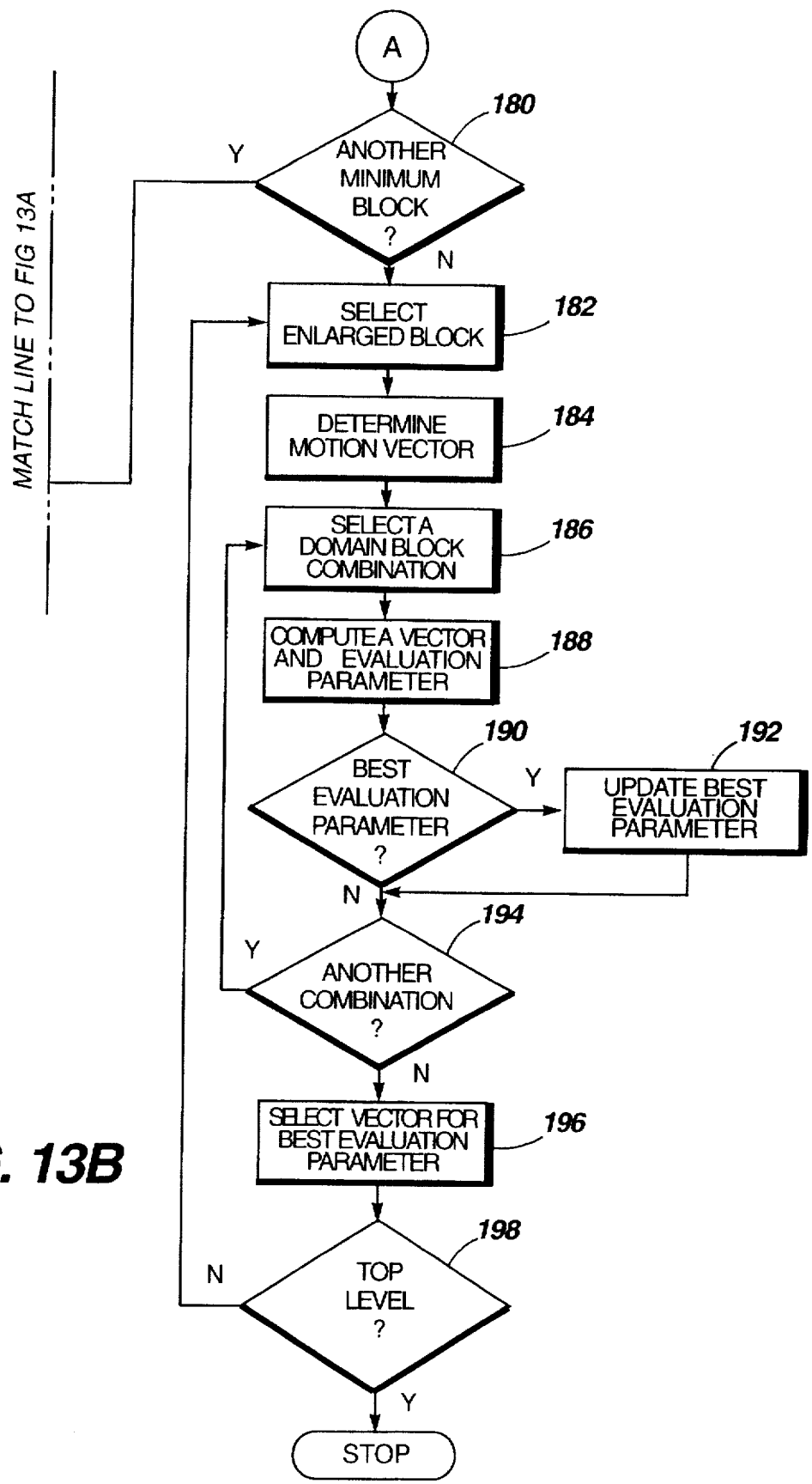

In another preferred embodiment, the data representation of a current frame may be generated by evaluating data representations for blocks of the same size and then determining whether the data representation for a block which is a union of the blocks is more efficient. This embodiment is called a bottom up implementation while the implementation discussed above which compares the data representation of a block to the data representation of a block segmented from it is called a top down implementation. The process for the bottom up implementation is shown in FIG. 13. The process initially begins by dividing the current frame into blocks having the same size as the top level blocks of the top down method (Block 160). Using these blocks, motion vectors are predicted for the blocks which may be used to express the motion vectors for other blocks as differential vectors (Block 162). The current frame is then segmented into blocks of a predetermined minimum size (Block 164). One of these blocks is then selected as a domain block and a range area within the previous frame is identified and adjusted (Block 166). Blocks within the range area are selected (Block 168) and an evaluation parameter measured (Block 170). The evaluation parameters are compared to determine the best evaluation parameter (Block 172). The best evaluation parameter is updated, if necessary (Block 174), and the process determines if there is another block to process (Block 176). When the last block in the range area is processed, a vector for a minimum block is built (Block 178). This process continues for the minimum blocks (Block 180).

The bottom up method continues by increasing the size of the domain block to an integral of the first domain block size (Block 182). Preferably, the integral size is double the first domain block size. The blocks of the first domain block size within the enlarged domain block are identified and a motion vector for the enlarged block is determined (Block 184) by identifying a range area in the previous buffer and determining the vector as discussed above. For each possible combination of domain blocks within the enlarged block, a vector and evaluation parameter are computed (Block 188) which includes a component for identifying a domain block combination and the enlarged block data representation. This representation preferably includes a new q value which is based on the difference between the mean of the data element values in the domain blocks for the enlarged block which are not in the selected domain block combination and the mean for the data elements in the domain sized blocks of the corresponding block for the enlarged block in the range area of the previous frame which are not in the selected domain block combination. The new q and new distortion measure based on the new q which is a sum of the new distortion for the domain blocks not in the domain block combination are used to generate the evaluation parameter for the enlarged block. The evaluation parameter is compared to the sum of the evaluation measurements for the domain blocks in the selected combination (Block 190), and the best evaluation parameter is updated, if necessary (Block 192). After the evaluation parameters for each domain block combination are determined (Block 194), the data representation corresponding to the best evaluation parameter is selected (Block 196). This process may be repeated for the next integral size of enlarged blocks until the top level size block is reached (Block 198).

Figure 14:
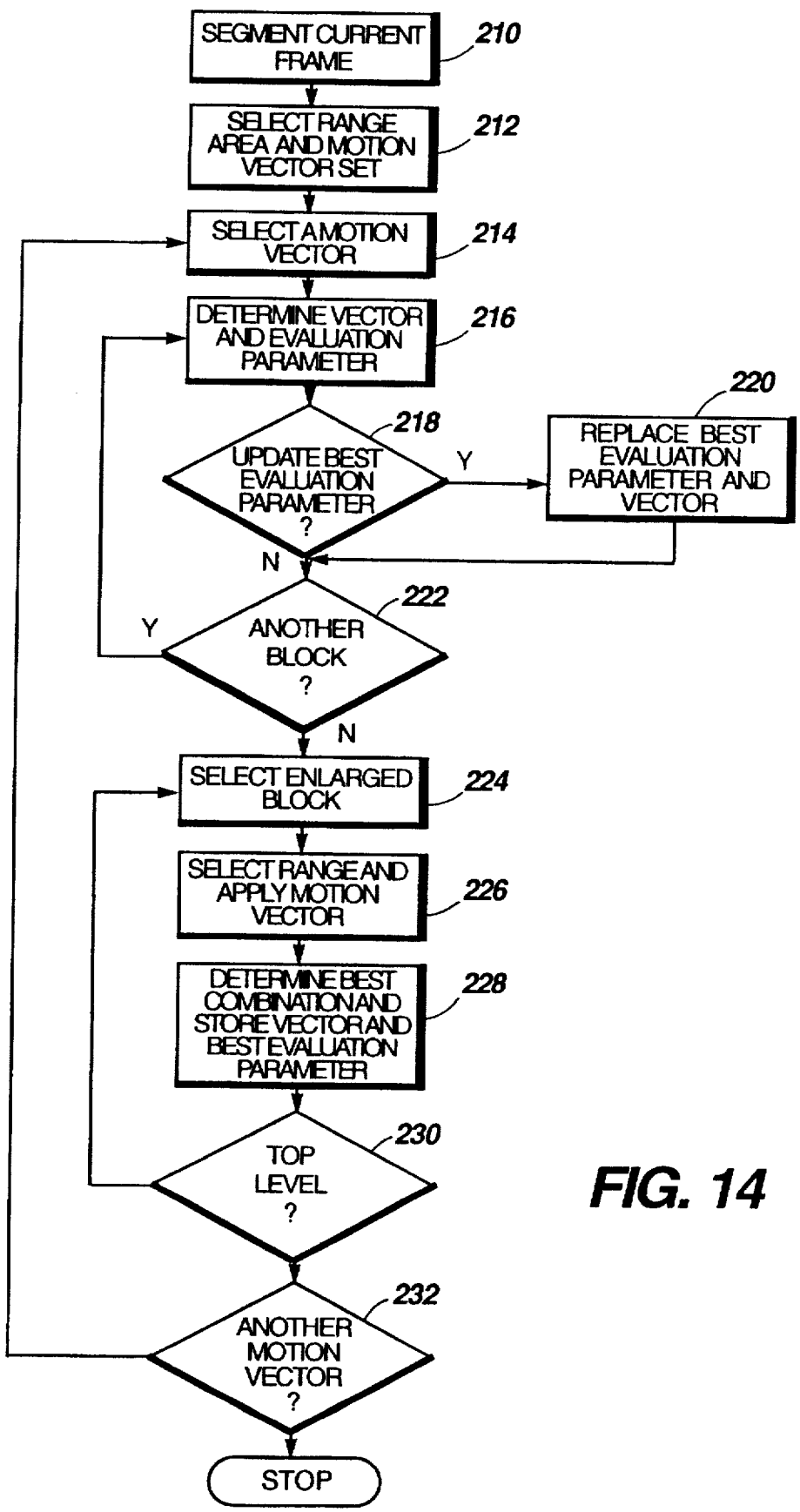
FIG. 14 is a flowchart for a preferred bottom up process.

The preferred process for implementing the bottom up approach is shown in FIG. 14. That process begins by segmenting the current frame into minimum blocks (Block 210). A range area and motion vector set is selected (Block 212). Preferably, the range area for each of the blocks at the minimum block level are the same size so that the motion vector set for all of the blocks are the same. A motion vector from the motion vector set is then selected (Block 214), and applied to each block so a vector and evaluation parameter for each block is computed (Block 216). The evaluation parameter for each block is compared to previous evaluation parameters computed for the block (Block 218). If the current evaluation parameter is better than the previous evaluation parameter the best evaluation parameter is replaced with the current evaluation parameter and its corresponding vector (Block 220). This process continues until all of the minimum size blocks have been processed with the selected motion vector (Block 222).

An enlarged block, which is preferably comprised of four adjacent minimum sized blocks, is selected (Block 224). A range is selected for this block and the selected motion vector applied to the block (Block 226). Each combination of minimum size blocks within the enlarged block using the applied motion vector is computed and the combination corresponding to the best evaluation parameter is determined and stored (Block 228). The process then determines whether there is a next larger block size to process (Block 230), and if there is, the enlarged block process continues. Following the processing of the largest size block, the process determines whether another motion vector remains in the motion vector set to be applied (Block 232). If there is, the process continues by evaluating the best vector and evaluation parameter for the minimum size blocks and then for each enlarged size block. When the last motion vector has been applied, this process has determined the best vector for each minimum size block and each enlarged size block processed. While the process in FIG. 14 applies motion vectors to the blocks to simplify the computations for determining the best vectors, an affine matrix having non-zero a, b, c, and d coefficients may be used.

While the vectors of the present invention generated by compressor 12 provide a number of advantages and benefits not previously known, further efficiencies may be obtained by incorporating an entropy encoder. The encoding of the vectors into codewords is sometimes called packing. Preferably, the entropy coder is a Huffman encoder, although other entropy encoders may be used. A Huffman encoder utilizes the vector for a block as an index into an array of codewords of varying lengths. The codewords are arranged by methods well known in the art and they have the property that a concatenation of the codewords can be instantaneously and unambiguously decoded into the original vectors. The number of bits required to represent a vector is sometimes called the bit stream rate and this is preferably returned to the compressor for evaluation of a vector. To reduce storage requirements for the array of codewords, the array is divided into a plurality of arrays which correspond to one or more components of the vectors. For example, in the general case, a vector has the definition (shape, a, b, c, d, dx, dy, p, q) and the corresponding arrays for the Huffman encoder would preferably include an array for shape, one for the components (a, b, c, d), another for (dx, dy) and another for q. Additionally, a separate list of codewords is provided for identifying each block size. The efficiency of the Huffman encoder may be further improved by utilizing an adaptive scheme, in which the lengths of the bit streams for the codewords being generated during the compression process are modified. Such adaptive schemes are well known within the art. Most preferably, the tables of the Huffman encoder are optimized for each block size. That is, there are tables which correspond to each size block to be processed by the system and the table which corresponds to the size of the block currently being processed is used for a block.

Figure 15A:
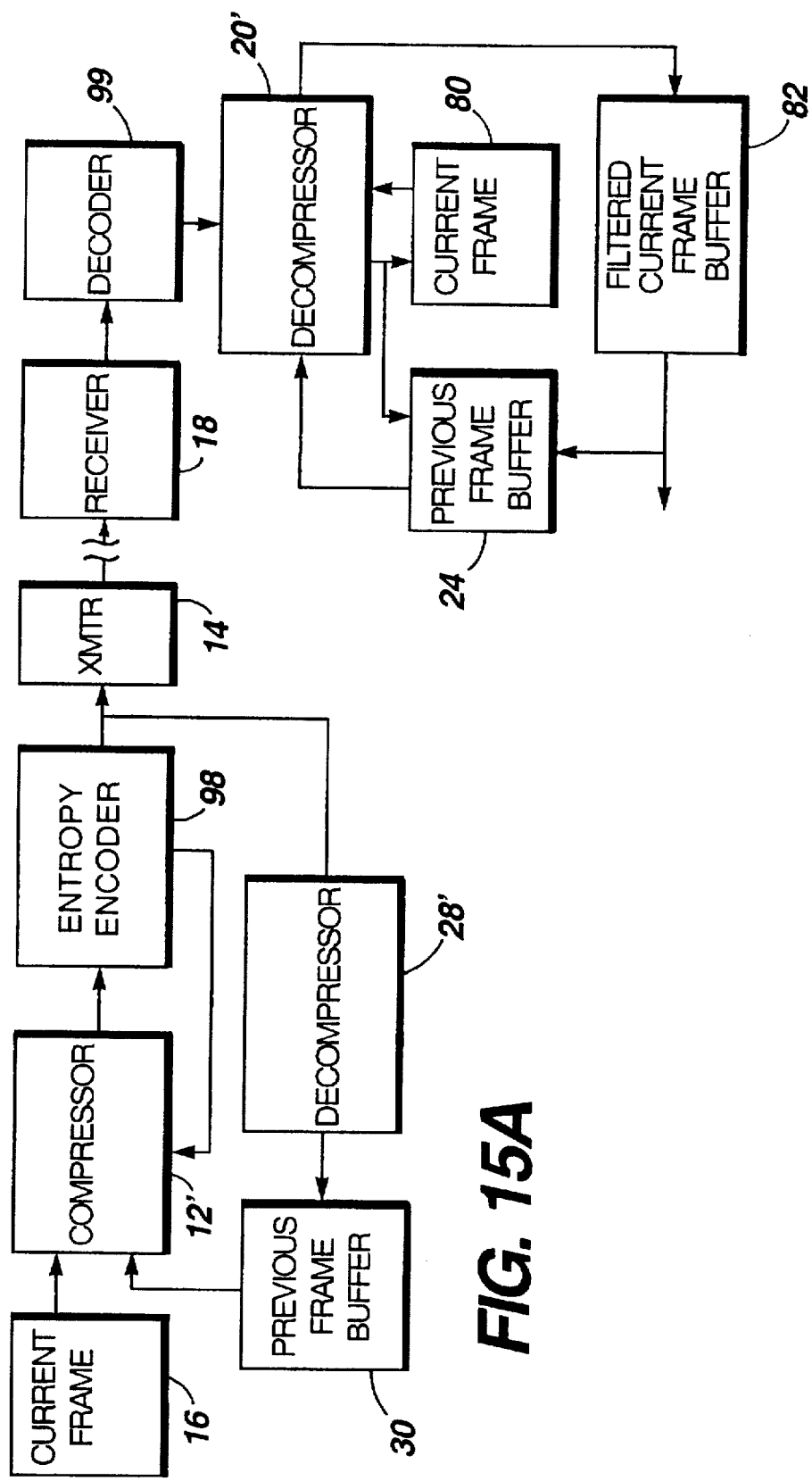
FIG. 15A is a block diagram of the system in FIG. 1 which further includes an entropy encoder which is used to evaluate the efficiency of the codewords being generated by the compressor in the diagram.

A system incorporating an entropy encoder is shown in FIG. 15A. Using like numbers to identify like components as discussed with respect to FIG. 1, FIG. 15A shows a current frame buffer 16, a previous frame buffer 30, a decompressor 28' and a transmitter 14. The compressor 12' generates vectors which represent the video data of the current frame buffer 16 in terms of the video data contained in frame buffer 30 as explained before. The compressor 12' includes (FIG. 15B) a segmenter 70 for segmenting the data elements of a frame buffer into groups of pixels or blocks, an element adjuster 72 for determining the q parameter, an evaluation parameter generator 74 for measuring evaluation parameters, a evaluation parameter comparator 76 for determining a best evaluation parameter and memory 78 for storing vectors, evaluation parameters and data adjustment values. In the compressor of FIG. 15A, the selection of the vectors to represent a block includes evaluation of the size of the codewords which represent the vectors. The bit size of the codewords for representing the vectors are provided by encoder 98 to evaluation parameter generator 74. Encoder 98 provides the encoded vectors to transmitter 14 and decompressor 28'. Decompressor 28' unpacks the encoded vectors and then performs the decompressor process to generate the previous frame data for buffer 30. At the receiver site, a decoder 99 decodes the codewords received by receiver 18 and provides the decoded vectors to decompressor 20 which generates a current frame using the previous frame stored in buffer 24. The system of FIG. 15A incorporates the coding efficiencies of encoder 98 to reduce the codewords transmitted by transmitter 14 to receiver 12.

While some further efficiency may be obtained by simply including an entropy encoder 98 in the system as shown in FIG. 15, further efficiencies may be obtained by using data from the encoder to calculate the evaluation measurement used to select a best block pair and to evaluate whether a parent or child block best represents a segment in the current frame. Preferably, the corresponding bit size for representation of a vector is compared to any representation improvement provided by a larger vector to determine whether the additional bit cost is worth the better correspondence between a segment in the current frame and a segment in frame buffer 30. For example, compressor 12' may generate child blocks from a lower level block and determine that one or more of the child blocks correspond to the data in the previous frame buffer. However, by having compressor 12' pass the codeword corresponding to that child block to encoder 98 and having encoder 98 return the bit size associated with that vector, compressor 12' may determine that the improvement in block representation measured by the differential in the distortion measurements between the lower level block and the child block is small compared to the additional bits required to represent the vector for the child block. As a result, compressor 12' may determine that the vector for the child block cannot be efficiently represented and terminate processing of blocks which are children of the block currently being processed.

Figures 15B, 16:
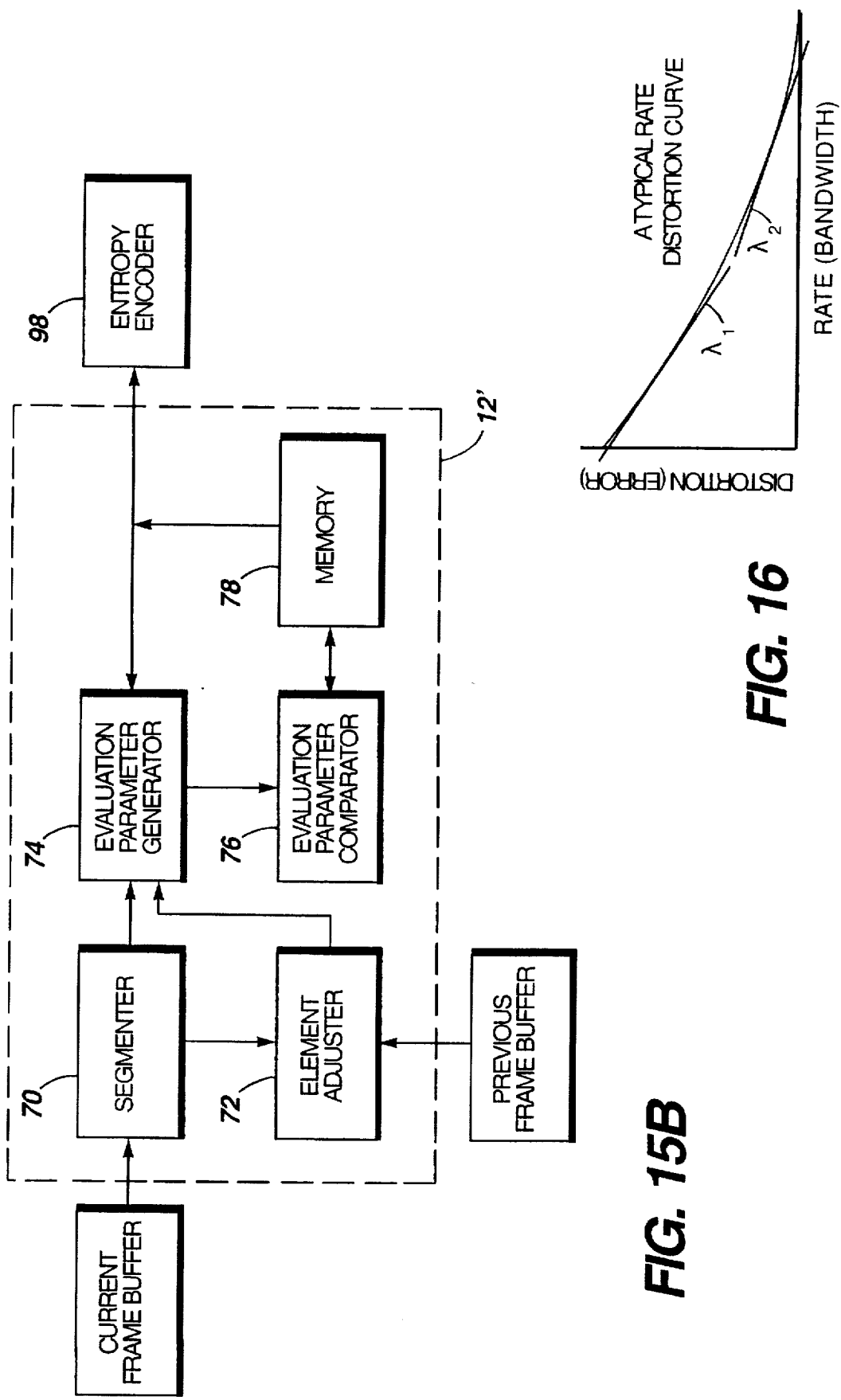
FIG. 15B is a block diagram of the compressor shown in FIG. 15A.
FIG. 16 is an example of a bit rate/error curve and a tangent line identifying an optimal point of operation.

Preferably, the component within compressor 12' which performs this function uses a rate-distortion curve as shown in FIG. 16. As indicated in that FIG., there is an inverse relationship between the number of bits used to represent frame data and the error generated in the approximate representation in the current frame. Specifically, as fewer bits are used to represent the current frame, the error in the representation goes up while the error goes down when more bits are used to represent the data. The family of lines which are tangent to a point along the curve shown in FIG. 16 identify optimal points of operation on the curve. The points which lie below the tangent line are considered to be acceptable while points lying above the line are considered to be unacceptable. That is, if the distortion value or the rate value takes the point to a location so that it lies above the tangent line, then the distortion is too great or the resulting bit stream too large to efficiently represent the vector. Preferably, a tangent line at the point where the distortion and bit rate are equal is selected for use in evaluating codeword selection. Alternatively, a point for a particular bit rate may be selected to continue the process.

As a result, the component within compressor 12' which performs this function of evaluating the efficiency of codewords does so by minimizing a cost value where $C = D + \lambda \times R$. In this equation, C is the cost of a codeword, D is the distortion measurement between the representation of a segment and the segment itself, and R is the number of bits required to a codeword which represents a vector. This bit number is provided by encoder 98. The $\lambda$ coefficient is the negative slope for one of the tangential lines for a rate-distortion curve. To evaluate codeword costs between a parent and child block in the top down implementation, the cost evaluator within compressor 12' first measures a distortion between a parent domain block within current frame buffer 16 and its corresponding block in frame buffer 30 being moved to represent the domain block in the current frame. This distortion measurement is preferably a differential measurement of either of the squared error or absolute error type. The squared error is computed as the sum of the square of the differences between the pixel data values in the current frame buffer and the corresponding pixel data values in the block of buffer 30. The absolute error measurement is the sum of the absolute value of the differences between pixel data values in the current frame buffer and the corresponding pixel data values in the corresponding block of buffer 30.

With these measurements, the cost evaluating component of compressor 12' determines whether a codeword for a child block is selected by the equation $dC = \lambda \times dR + dD$. That is, the change in costs in adding the child codeword to the data representation that includes the parent codeword is equal to the negative slope of the selected tangential line times the increase in the number of bits required for the additional codeword and the decrease in the distortion value. For this reason, blocks are processed one quadrant at a time as explained in more detail below. If the cost function is negative, then the codeword is determined to be worth the additional bit cost. Otherwise, the codeword and child block are rejected as not efficiently representing the current frame buffer data. This same cost functions may also be used as the evaluation parameter to evaluate which block pair results in the best motion vector.

In the bottom up implementation, the evaluation measurement which includes the bit cost component preferably includes a computation of the vector cost for the enlarged block for each domain block combination. The codeword for the enlarged block includes the shape field corresponding to the domain block combination being evaluated, the coefficients for the motion vector or affine map matrix determined for the enlarged block/corresponding block in the previous frame, and a new distortion measurement. The new distortion measurement arises from the exclusion of the data elements for the domain blocks in the domain block combination from the enlarged block. That is, the mean of the data elements of the domain blocks not in the domain block combination and the mean of the data elements in the previous frame which correspond to these data elements are used for the q parameter computation. To facilitate the computation of the new distortion measurement, the distortion measurement for the entire enlarged block and corresponding block in the previous frame is computed by domain block. Specifically, the squared difference distortion measurement may be algebraically manipulated to produce:

$$\Sigma(x_{i,j}-(y_{i,j}+q))^2 = \Sigma x^2_{i,j} - 2x_{i,j}y_{i,j} + y^2_{i,j} + q(2y_{i,j} - 2x_{i,j}) + q^2$$

As the distortion measurement is computed for an enlarged block, the terms not involving q are computed and stored for each minimum block in the enlarged block. When a minimum block combination is selected, the blocks not in the combination are used to compute a new mean for the enlarged block since the enlarged block includes fewer data elements than when the distortion parameter was computed for the whole enlarged block. To reduce the computation time to calculate the distortion parameter the terms involving the new q parameter are calculated and added to the stored non-q terms for the blocks not in the selected combination. This distortion value is then used to compute the evaluation parameter for the enlarged block and this parameter is compared to the evaluation parameter for the selected domain block combination to determine whether the enlarged block combination should be selected. Thus, the squared difference distortion measurement is preferred for the bottom up implementation if the q parameter is non-zero. Otherwise, either distortion measurement may be used.

Figure 17:
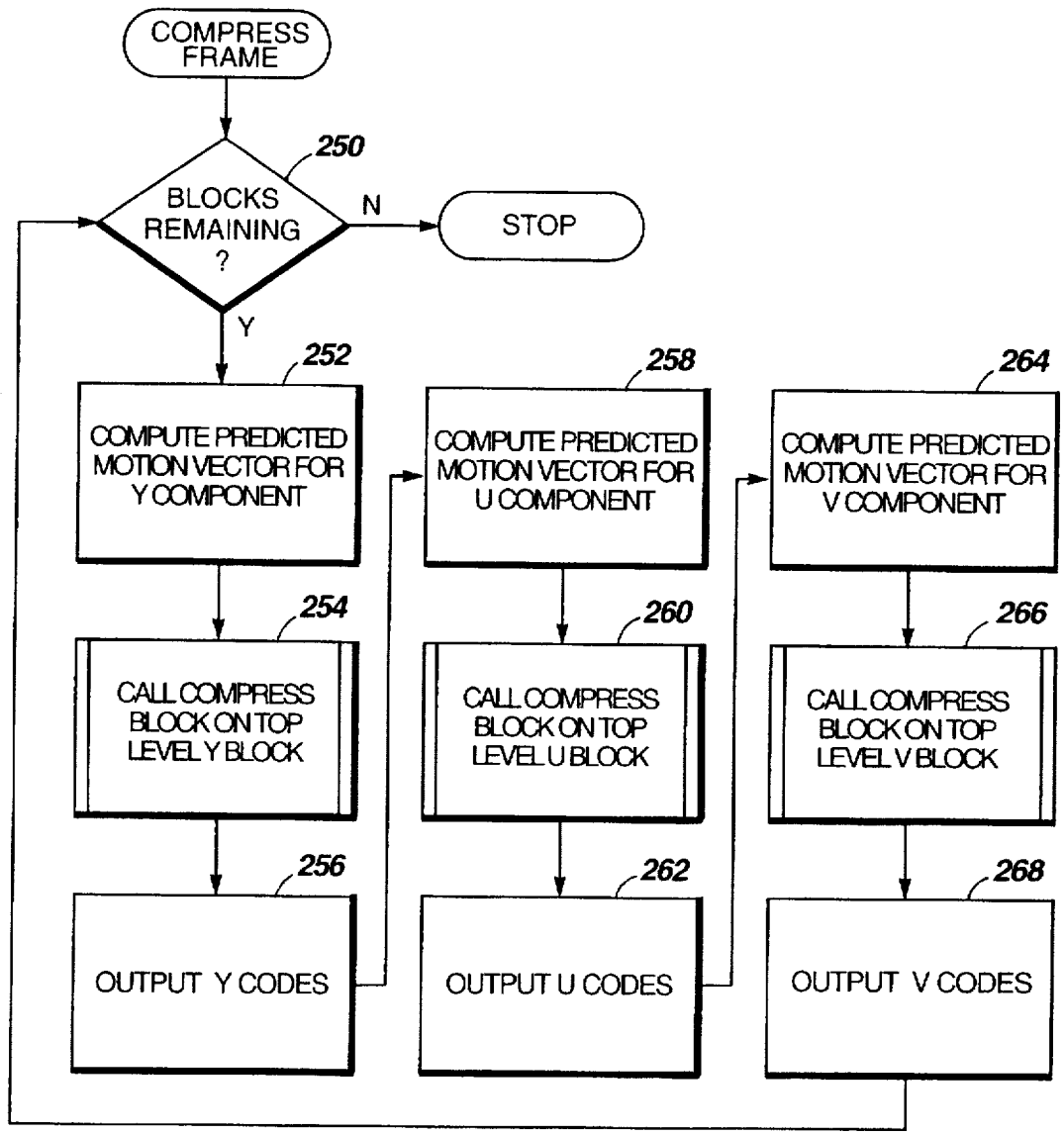
FIG. 17 is a flow chart of the frame compressor process implemented by the compressor shown in FIG. 15.

The process for compressing a frame of video data implemented in compressor 12' is shown in FIG. 17. The process shown in FIG. 17 already assumes that system initialization has occurred and that a current frame is being compressed in a top down manner in terms of data within a previous frame buffer. The process begins by determining whether a level 0 block remains for processing in current frame buffer 16 (Block 250). If not, the frame has been processed and the compression function terminates. Otherwise, the predicted motion vector for the block in the Y screen component is computed (Block 252). The compressed block function is then called to recursively generate the codewords for representing the vectors of the Y block component (Block 254). These codes are then output to encoder 102 for encoding into a bit stream which is provided to transmitter 14 (Block 256). The predicted motion vector for the corresponding block in the U screen component is computed (Block 258) and the compressed block routine is recursively called to generate the codewords which represent the vectors for the U screen component (Block 260). These codes are output to encoder to 102 for encoding and transmission to the receiver (Block 262). Finally, the predicted motion vector for the corresponding V screen component is computed (Block 264), the compressed block routine used to generate the corresponding codewords (Block 266), and the codewords for the V screen component block are provided to encoder 102 (Block 268). The process continues until all of the blocks in the current frame buffer have been processed.

Figure 18A:
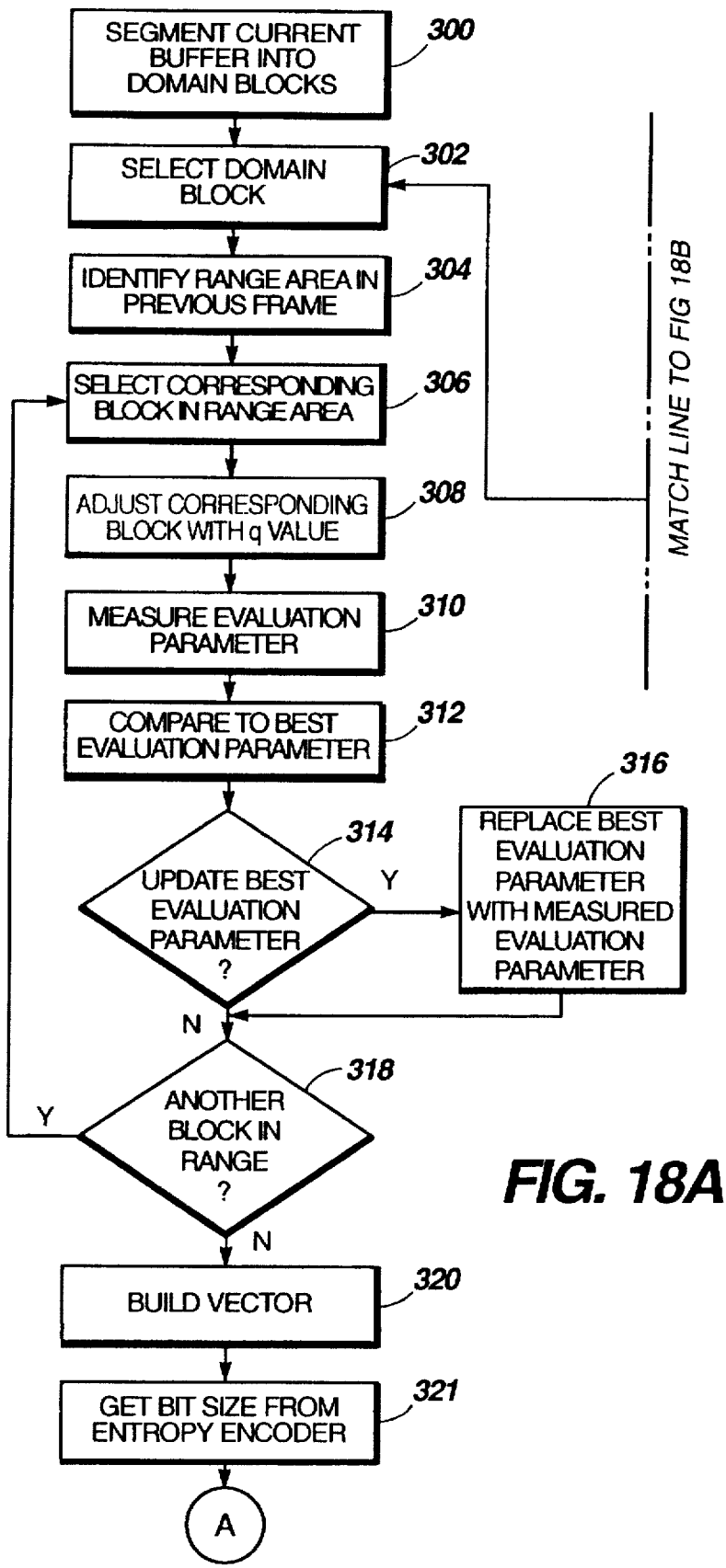
FIGS. 18A and 18B are a flowchart for the block compression process performed by the compressor of FIG. 15.
Figure 18B:
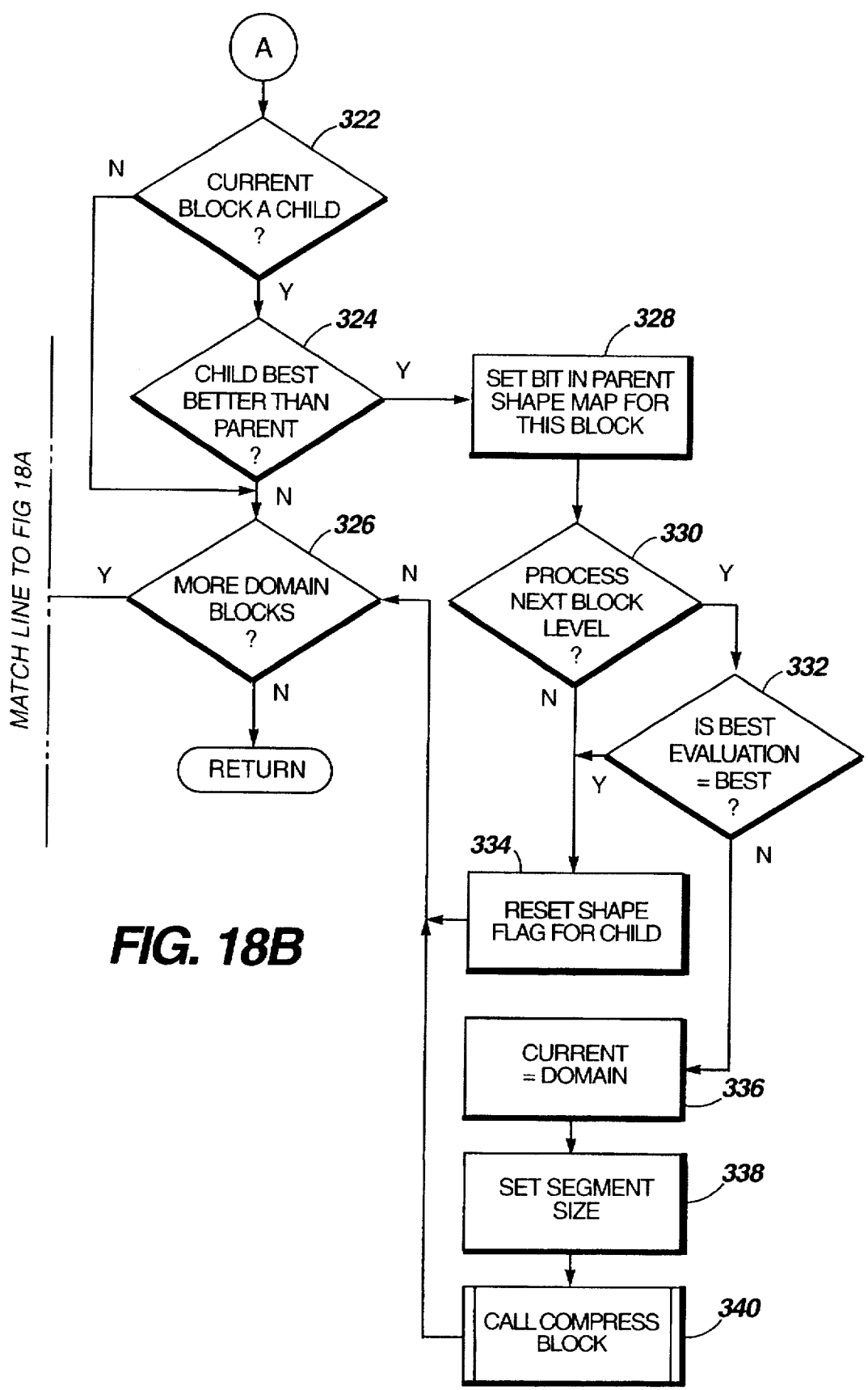
Figure 21:
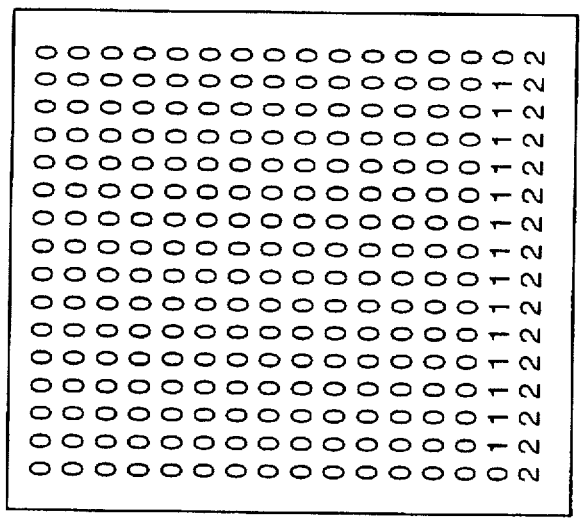
FIG. 21 is an example of a weighted mask used on the bottom block shown in FIG. 15 for a preferred embodiment of the present invention.
Figure 20:
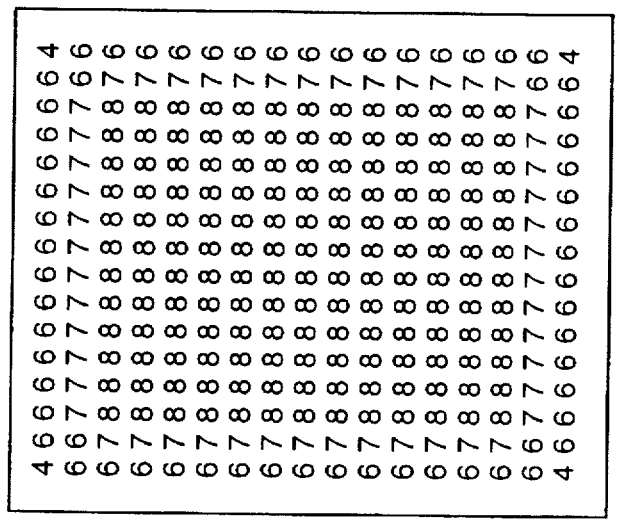
FIG. 20 is an example of a weighted mask used on the current block shown in FIG. 15 for a preferred embodiment of the present invention.

The process for compressing a block is shown in FIGS. 18A and 18B. Preferably, this process is a recursive process though other implementational techniques may be used. The process begins by segmenting the current frame buffer into to domain blocks (Block 300). A domain block is then selected (Block 302) and a range area identified within previous frame buffer 30 (Block 304). A corresponding block is then selected within the range area (Block 306). The q parameter is then calculated for the corresponding block in the range area by calculating the mean pixel value for the domain block and the mean pixel value for the corresponding block in the range area and subtracting the mean value for the corresponding block from the mean domain value. This value is then added to all of the pixel elements in the corresponding block (Block 306). An evaluation parameter is then measured between the domain block and the current frame buffer and the corresponding block in the range area (Block 310). This evaluation parameter is compared to the previously determined best evaluation parameter for this block and the best evaluation parameter updated, if necessary (Block 312). For example, if the evaluation parameter is a bit cost measurement and the bit cost measurement for the current corresponding block/domain block pair is less than the previously best calculated bit cost parameter for a block pair at this level, then the new bit cost parameter replaces the old bit cost parameter. The process then determines whether another corresponding block in the range area needs to be evaluated (Block 314) and, if it is, evaluation of the block comparison continues at (Block 308). Otherwise, the process builds a vector by determining the dx, dy components for the motion vector corresponding to the corresponding block/domain block pair having the best evaluation parameter (Block 316). The vector is then passed to the entropy encoder which returns the size of the codeword needed to encode the vector (Block 318). If the domain block is a child of a parent block (Block 320), the evaluation parameter is compared to the evaluation parameter of the parent (Block 322). Otherwise, the process verifies whether there are more domain blocks to check (Block 324), and if they are the process then continues evaluating domain blocks (Block 302). Otherwise, the process returns.

If the evaluation parameter for the current block level is better than the evaluation parameter for the preceding block level, a bit indicating that the child block vector should be included is set at the preceding block level (Block 326). The process continues by determining whether the next block level is processed (Block 328), and if it is not, the shape flag bit for the current level is set to zero and the process determines whether other domain blocks remain to be processed (Block 330). If the next level of blocks can be processed, the process determines whether the evaluation parameter can be improved (Block 332). If it cannot, the shape flag is reset (Block 330) and remaining domain blocks are processed, if any. If the evaluation parameter can be improved, the process identifies the current frame as the block being processed and segments the current buffer into domain blocks of a predetermined size (Block 334). Preferably, the segmentation of the blocks other than at the parent level is performed by dividing the current block into four equal sized blocks. The process then continues by calling itself (Block 336). Upon the return of the last block down a recursive path, the process verifies whether any more domain blocks at this level remain to be processed (Block 334). If they are, these blocks are also processed. The recursive line of compressed block routines are terminated either by the processing of every block possible in the segmentation tree or achievement of one of the conditions which terminate processing. These two conditions are that the evaluation parameter for a child is not an improvement of the parent evaluation parameter or that the evaluation parameter cannot be improved.

Decompressor 20' preferably implements the decompression process shown in FIG. 12. However, after the regenerated frame has been stored in buffer 24, it is also preferably stored in current frame buffer 80. The contents of current frame buffer 80 are further processed to reduce artifacts and enhance image quality. This processed current frame is stored in filtered current frame buffer 82 for display at the receiver site. The contents of buffer 82 are preferably used to refresh buffer 24 so that the next regenerated frame is generated from the filtered data. The filtering also preferably occurs in decompressor 28' and the filtered data preferably used in previous buffer 30.

Without filtering, the data elements of the current frame are determined by a process which may be implemented by the following code:

```
for (j=0;j<blocksize;j++)
    for (i=0;i<blocksize;i++)
        if (mask (shape,i,j)==0)
            Current (i + domain_x,j+domain_y)=
                CLIP (Previous (i+domain_x+dx,j+domain_y+dy)+q)
```

Where the function:

$$CLIP(x) = \begin{vmatrix} 0 & \text{if } x < 0 \\ 255 & \text{if } x > 255 \\ x & \text{otherwise} \end{vmatrix}$$

The mask (shape, i, j) returns a value of 1 if the pixel is within a child block which is included in the data representation of the parent block. Current (i+domain_x,j+domain_y) defines a pixel location in the current j buffer which is set to the value of the data element at Previous (i+domain_x+dx,j+domain_y+dy) and the q parameter is used to adjust the data element value.

To reduce the possibility of artifacts in the regenerated frames, decompressors 20' and 28' may also include weighted mask filtering called fuzzy pixels. This function replaces each single pixel move for the application of a motion vector by nine pixel moves through a weighted mask. An example of code which implements the fuzzy pixel process is:

```
for (j=0;<blocksize;j++)
    for (i=0;i<blocksize;i++)
        if (mask (shape,i,j)==0)
            for (dy=-1;dy<1;dy++)
                for (dx=-1;dx<=1;dx++)
                    Current (i+domain_x+dx,j+domain_y+dy)+=
                        CLIP (fuzz(dx,dy)*
                            Previous (i+domain_x+dx,j+domain_y+dy)+q)
```

The fuzz mask returned by the fuzz function in the preferred embodiment is defined by a matrix having the following coefficients, although other bit mask values may be used:

| 2/25 | 3/25 | 2/25 |
|------|------|------|
| 3/25 | 5/25 | 3/25 |
| 2/25 | 3/25 | 2/25 |

This mask assumes that the block to be filtered does not lie on the edge of the frame in either of the frame buffers 30, 104. For the blocks in the upper, leftmost corner or left edge of the frame, the fuzz masks used in the preferred embodiment are, although other bit mask values may be used:

| 0 | 5/25 | 2/25 |     | 0 | 0    | 0    |
|---|------|------|-----|---|------|------|
| 0 | 8/25 | 3/25 | and | 0 | 13/25| 5/25 |
| 0 | 5/25 | 2/25 |     | 0 | 5/25 | 2/25 |

The other edges and corners of the frame buffer are treated in a symmetrical manner. Preferably, the pixels on an edge or corner of previous frame buffer 104 are only mapped to pixel locations for the regenerated frame that are on the same edge or corner. Thus, this filtering generates data elements for the regenerated frame which are the sum of a contribution from the nine adjacent data elements in the previous frame. This tends to smooth the differences between pixels and reduce artifacts. To facilitate implementation in a binary digital computer, the denomination of the coefficients may be a power of 2.

When the pixel values surrounding a pixel element differ from substantially from the pixel element, the fuzzy pixel method may generate artifacts at block boundaries. Another method for reducing artifacts at block boundaries in the regenerated frames is a method known as overlapped motion compensation. In this method, the blocks in the current frame buffer 104 are processed using a weighted sum of four adjacent blocks. The four adjacent blocks which are used to generate the overlapped motion compensated are shown in FIG. 15. Specifically, the motion vectors for each of these four blocks are used in conjunction with a bit mask to modify regenerated pixel data elements in the outer two rows and columns of pixel data elements in the current block being processed in frame 104. The motion vectors for these four blocks are denoted as $(x_{top}, y_{top})$, $(x_{left}, y_{left})$, $(x_{right}, y_{right})$, and $(x_{bottom}, y_{bottom})$. If any of the four blocks identified in FIG. 19 lie outside the frame data so that there is no corresponding motion vector, the motion vector for the current block is used instead. Without overlapping motion compensation, values for regenerating the current frame by decompressor 20' are generated according to the following function:

$$\text{Current } (i,j) = \text{Previous}(i+dx,j+dy)$$

where the indices (i, j) range over the pixels in the current block. For the overlapped motion compensation technique, the new value for a pixel data element is determined by the function:

$$\text{Current}_{new}(i, j) = \text{Current}_{old}(i, j) * \text{mask}_{current}(i, j) +$$
$$\text{Previous}(i + x_{top}, j + y_{top}) * \text{mask}_{top}(i, j) +$$
$$\text{Previous}(i + x_{bottom}, j + y_{bottom}) * \text{mask}_{bottom}(i, j) +$$
$$\text{Previous}(i + x_{right}, j + y_{right}) * \text{mask}_{right}(i, j) +$$
$$\text{Previous}(i + x_{left}, j + y_{left}) * \text{mask}_{left}(i, j) +$$

Figure 19:
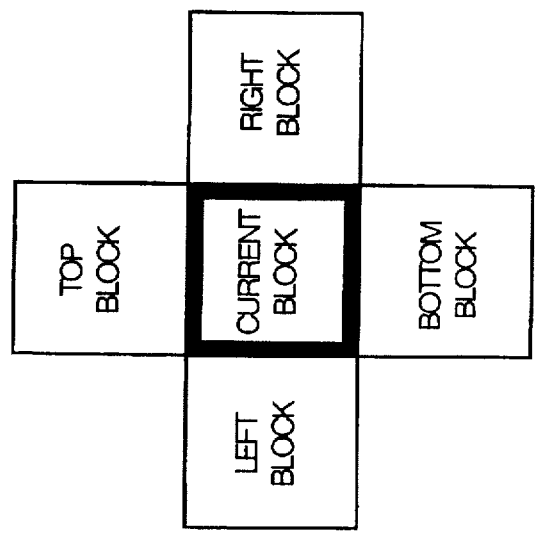
FIG. 19 is an example of the adjacent blocks for a block in a previous frame buffer which are used to reduce blocking artifacts in a regenerated frame.
Figure 24:
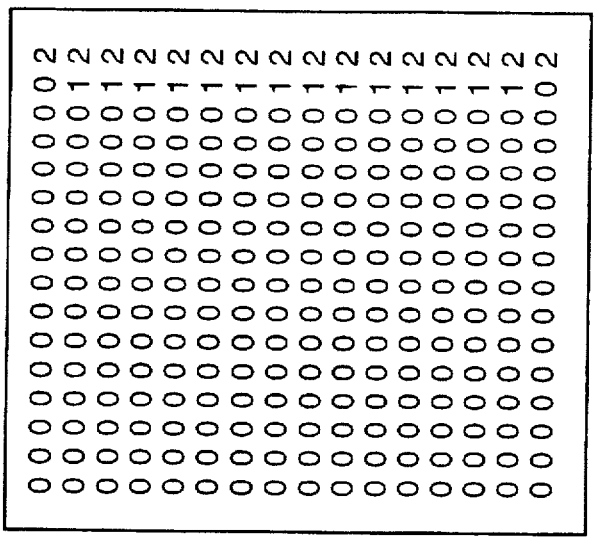
FIG. 24 is an example of a weighted mask used on the right block shown in FIG. 15 for a preferred embodiment of the present invention.
Figure 23:
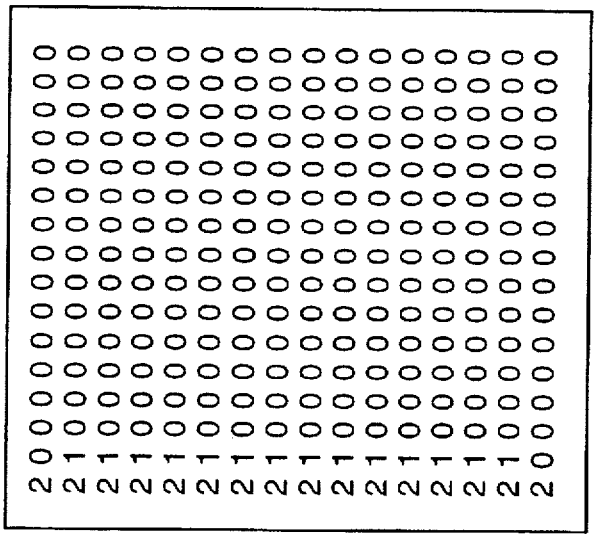
FIG. 23 is an example of a weighted mask used on the left block shown in FIG. 15 for a preferred embodiment of the present invention.
Figure 22:
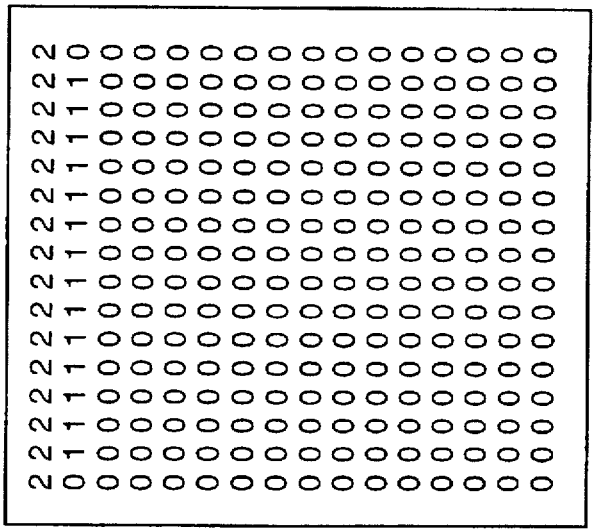
FIG. 22 is an example of a weighted mask used on the top block shown in FIG. 15 for a preferred embodiment of the present invention.

The weighting masks for each of the blocks in FIG. 19 are depicted in FIGS. 20 through 24. The coefficients shown in these masks have been converted to integers by multiplying the actual mask values used by eight (8). This method tends to smooth the differences between blocks in the previous frame to reduce artifacts in the regenerated frame.

While the overlapping motion compensation reduces blocking artifacts, it may also create blocking artifacts when a scene change occurs or new objects are introduced into a new frame. This change may cause substantial pixel element differences at block boundaries which are difficult to smooth using the motion compensated technique. To overcome this limitation, mean-corrected overlapping compensation is preferably used. This technique includes the modification of the 30 pixel data elements which are in the outer two rows and columns of the current block to correct their mean value. The modified function to generate a current pixel value using this technique is:

Current$_{new}(i, j)$ = Current$_{old}(i, j)$ * mask$_{current}(i, j)$ +

Previous$(i + x_{top}, j + y_{top}) + q_{top}$) * mask$_{top}(i, j)$ +

Previous$(i + x_{bottom}, j + y_{bottom}) + q_{bottom}$) * mask$_{bottom}(i, j)$ +

Previous$(i + x_{right}, j + y_{right}) + q_{right}$) * mask$_{right}(i, j)$ +

Previous$(i + x_{left}, j + y_{left}) + q_{left}$) * mask$_{left}(i, j)$ +

The q values, $q_{top}$, $q_{bottom}$, $q_{right}$, and $q_{left}$, are used to adjust the 30 pixels in the top, bottom, right and left blocks, respectively, which correspond to the 30 pixels in the current block. They may be computed in one of two methods. In the first method, the mean value for the 30 pixels in the current block which have non-zero coefficients is subtracted from the pixels having non-zero coefficients in the corresponding masked block in the previous frame buffer. If the masked block does not lie within the frame buffer, the q value is set to zero. In the second method, the q values are the difference between the mean of the two columns or rows of blocks in current frame buffer 104 which are adjacent to the current block being processed in buffer 104 and the mean of the two columns or rows of the current block in buffer 104. The adjustment of the pixel element values along with the weighted mask filtering help reduce the occurrence of artifacts at block boundaries in the regenerated frame.

In use, a system of FIG. 15A is installed so current frame buffer 16, previous frame buffer 30, compressor 12', encoder 102, compressor 28' and transmitter 14 are at a site where a sequence of video frames are being generated. Transmitter 14 transmits the encoded codewords which represent a current frame of video data that was generated and stored in current frame buffer 16 to a receiver 18 and a corresponding decoder 106, decompressor 20', previous frame buffer 24 for use at the receiver site. Upon receiving an indication that current frame buffer 16 has a first frame of video data to process, a signal is transmitted to receiver 18 to activate compressor 20' which initializes previously generated frame buffer 24 with the mid-scale gray values. Likewise, compressor 12' initializes the previous frame buffer 30 with the same gray scale value. Hereafter, compressor 12' performs the compress frame and compress block functions on the video data contained within current frame buffer 16 using the data in previous frame buffer 30. The resulting vectors for corresponding blocks between these two buffers of video data are evaluated in accordance with the bit rate values provided by encoder 102 to efficiently represent the current video frame data within frame buffer 16. The selected vectors are encoded by entropy encoder 102 and provided to transmitter 14 for transmission to receiver 18. Likewise, the encoded vectors are provided to decompressor 28' which decodes the bit stream to obtain the vectors which are applied to the data in frame buffer 30 to obtain the regenerated frame data which is stored in frame buffer 30. Receiver 18 provides the codewords to decoder 106 which in turn provides the vectors to decompressor 20'. Decompressor 20' uses the vectors to operate on frame data in buffer 24 to generate a current frame which may be stored in current frame buffer 104 and utilized at the receiver site. Preferably, decompressor 20' also applies a weighted mask filter to the data in the current frame buffer 104 to generate a filtered current frame buffer which is stored in buffer 106 and buffer 24. The filtering of the regenerated data is also performed by decompressor 28' and the filtered data stored in buffer 30. The techniques used to reduce the likelihood of artifacts in the filtered frame data are preferably the motion compensating and mean corrected motion compensating techniques.

While the present invention has been illustrated by a description of preferred and alternative embodiments and processes, and while the preferred and alternative embodiments and processes have been described in considerable detail, it is not the intention of the applicant to restrict or in any way limit the scope of the appended claims to such detail. Additional advantages and modifications will readily appear to those skilled in the art.

What is claimed is:

1. A method for representing a sequence of video frames of pixel data comprising the steps of:

segmenting a current frame of a video sequence into a plurality of blocks;

segmenting a portion of a previous frame in said video sequence into a plurality of blocks for each one of said blocks in said current frame;

measuring an evaluation parameter between each one of said plurality of blocks in said current frame and each block in said plurality of blocks in said previous frame that corresponds to each said block in said current frame;

comparing said measured evaluation parameters for each said block in said plurality of blocks in said current frame to determine a best evaluation parameter for each said block in said current frame; and determining a data representation for each said block in said current frame that corresponds to said best evaluation parameter for each said block in said current frame.

2. The method of claim 1, further comprising the steps of:

specifying a group of pixels not included in said current frame;

adding a zero value to a distortion measurement in response to a selected pixel being in said specified group; and including identifiers for said group of pixels in said data representation for said current frame.

3. The method of claim 1 said measuring step further comprising the steps of:

measuring a distortion parameter between said block in said current frame and said blocks in said corresponding plurality of blocks in said previous frame;

generating a bit cost for encoding each data representation for each said block in said current frame and each block in said corresponding plurality of blocks in said previous frame;

computing a difference between said bit cost for each said block data representation and said measured distortion corresponding to each data representation; and selecting said data representation corresponding to said computed difference that is a minimum.

4. The method of claim 3 wherein said distortion parameter is a squared difference measurement between data elements of said block in said current frame and data elements of a block in said corresponding plurality of blocks in said previous frame.

5. The method of claim 3 wherein said distortion parameter is an absolute difference measurement between data elements of said block in said current frame and data elements of a block in said corresponding plurality of blocks in said previous frame.

6. The method of claim 1 said measuring step further comprising the steps of:

measuring a distortion parameter between said block in said current frame and said blocks in said corresponding plurality of blocks in said previous frame;

determining said best evaluation parameter as said minimum distortion parameter of said measured distortion parameters.

7. The method of claim 6 wherein said distortion parameter is a squared difference measurement between data elements of said block in said current frame and data elements of a block in said corresponding plurality of blocks in said previous frame.

8. The method of claim 6 wherein said distortion parameter is an absolute difference measurement between data elements of said block in said current frame and data elements of a block in said corresponding plurality of blocks in said previous frame.

9. The method of claim 6 further comprising the step of:

computing a data adjustment value for data elements of said portion of said previous frame; and modifying said data elements of said portion of said previous frame prior to said measuring step.

10. The method of claim 9 further comprising the steps of:

computing a mean data element value for said data elements in said block in said current frame;

computing a means data element value for said data elements in said portion of said previous frame corresponding to said block in said current frame; and computing said data adjustment value as a difference between said computed mean value for said block in said current frame and said mean value for portion of said previous frame corresponding to said block in said current frame.

11. The method of claim 1 wherein said segmenting step segments said current frame into parent blocks and further comprising the steps of:

segmenting one of said parent blocks in said current frame into child blocks having a size different from said parent block;

segmenting a portion of said previous frame into a plurality of blocks for each one of said child blocks in said current frame;

measuring an evaluation parameter between each one of said segmented child blocks in said current frame and each block in said plurality of blocks in said previous frame corresponding to each said child block in said current frame;

comparing said measured evaluation parameters for each said child block in said current frame to determine a best evaluation parameter for each said child block for said parent block;

comparing said best evaluation parameter for each said child block to said best evaluation parameter for parent block; and including a data representation for each said child block in said data representation for said parent block in response to said best evaluation parameter for said child block being better than said best evaluation parameter for said parent block.

12. The method of claim 11 further comprising the step of:

representing said included data representation as a difference between said data representation for said parent block and said data representation for said child block in response to at least one of said data representations for said child blocks not being included.

13. The method of claim 11 further comprising the step of:

representing said included data representation for said nest generation block as a difference between said data representation for said parent block and said data representation for said next generation block in response to at least one of said data representations for said next generation blocks not being included.

14. The method of claim 11 further comprising the steps of:

entropy encoding said data representation for said parent and said child blocks; and transmitting said encoded data representations so that said current frame may be regenerated at a receiver.

15. The method of claim 11 further comprising the steps of:

modifying a shape field for said data representation for said parent block in response to a best evaluation parameter for a child being better than a best evaluation parameter for said parent block.

16. The method of claim 11 further comprising the steps of:

segmenting one of said child blocks of a parent block in said current frame into next generation blocks having a size different from said child block;

segmenting a portion of said previous frame into a plurality of blocks for each one of said next generation blocks in said current frame;

measuring an evaluation parameter between each one of said segmented next generation blocks in said current frame and each block in said plurality of blocks in said previous frame corresponding to each said next generation block in said current frame;

comparing said measured evaluation parameters for each said next generation block in said current frame to determine a best evaluation parameter for each said next generation block for said child block;

comparing said best evaluation parameter for each said next generation block to said best evaluation parameter for child block; and including a data representation for each said next generation block in said data representation for said parent block in response to said best evaluation parameter for said next generation block being better than said best evaluation parameter for said child block.

17. The method of claim 16 further comprising the step of:

continuing said segmenting step to generate blocks having a size different than said next generation block and said remaining steps of claim 16 are performed until said segmented next generation blocks are at a predetermined minimum size.

18. A method for generating a sequence of video frames comprising the steps of:

determining a pixel element location in a previous frame and a group of pixels corresponding to a vector at said pixel location;

determining whether a pixel in said group of pixels is included in a current frame;

applying a spatial component of said vector to said group of pixels to move said group of pixels to a current frame in response to said pixel being in said current frame;

adjusting data values for said group of moved pixels with a data adjustment value from said vector in response to said pixel being in said current frame; and continuing said both determining, said applying, and said adjusting steps until all vectors correlating said previous frame to a current frame being regenerated are applied to said previous frame.

19. The method of claim 2 further comprising the step of:

filtering said regenerated current frame to reduce artifacts in said current frame.

20. The method of claim 19 further comprising the steps of:

selecting a group of pixels surrounding a selected pixel element in said current frame;

applying a weighted mask to said pixel elements in said selected group;

summing a value formed by applying said weighted mask to said pixel elements to generate a new pixel value; and storing said new pixel value in said current frame.

21. The method of claim 20 wherein said selecting a pixel group step selects a second group of pixels from an adjacent group of pixels in said previous frame that corresponds to a motion vector determined for said adjacent group.

22. The method of claim 21 further comprising the step of:

adjusting data element values in said second group prior to applying said weighted mask.

23. The method of claim 22 further comprising the step of:

determining a data element adjustment value as a difference in mean value between said selected group of pixels surrounding said selected pixel element and a mean value of said second selected group of pixels.

24. The method of claim 23 wherein said second selected group is in said current frame.

25. A system for representing a sequence of video frames comprising:

a current frame buffer for storing a current frame of a video sequence to be represented;

a previous frame buffer for storing a previous frame from said sequence;

a compressor for generating vectors which correlate said previous frame to said current frame so that vectors may be used to regenerate all frames of said video sequence;

an encoder for encoding said vectors, said encoder being coupled to said compressor to receive said vectors;

an evaluation parameter generator coupled to said encoder, said evaluation parameter generating evaluation parameters that correspond to a distortion parameter and a bit size from said encoder;

a receiver for receiving said vectors;

a decoder coupled to said receiver to receive said encoded vectors, said decoder decoding said encoded vectors so that said decompressor may apply said decoded vectors to said previous frame;

a decompressor for generating a current frame by applying said vectors to said previous frame; and a second previous frame buffer for storing a second previous frame.

* * * * *